(12) United States Patent
Irie

(10) Patent No.: US 9,899,944 B2
(45) Date of Patent: Feb. 20, 2018

(54) CONTROL APPARATUS FOR ROTATING ELECTRIC MACHINE

(71) Applicant: DENSO CORPORATION, Kariya, Aichi-pref. (JP)

(72) Inventor: Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/593,720

(22) Filed: May 12, 2017

(65) Prior Publication Data

US 2017/0331403 A1    Nov. 16, 2017

(30) Foreign Application Priority Data

May 13, 2016 (JP) ................................. 2016-097452

(51) Int. Cl.
*G05B 11/36* (2006.01)
*H02P 21/05* (2006.01)
*H02P 6/08* (2016.01)
*H02P 6/15* (2016.01)

(52) U.S. Cl.
CPC ............. *H02P 21/05* (2013.01); *H02P 6/085* (2013.01); *H02P 6/15* (2016.02)

(58) Field of Classification Search
CPC ...... G05B 11/42; G05B 19/19; G05B 11/013; G05B 13/024; H02P 21/141; H02H 7/0851; H02H 7/085; B62D 5/0463; B62D 5/046
USPC ........... 318/434, 432, 727, 609, 610, 400.02
See application file for complete search history.

(56) References Cited

U.S. PATENT DOCUMENTS

| 5,936,378 | A  | * | 8/1999  | Iijima  | B60L 7/14 318/400.27 |
| 6,590,358 | B1 | * | 7/2003  | Tsutsui | G05B 5/01 318/560 |
| 7,556,106 | B1 | * | 7/2009  | Meinen  | E21B 21/01 175/207 |
| 2009/0072778 | A1 | * | 3/2009  | Schulz | H02P 6/08 318/721 |
| 2010/0295491 | A1 | * | 11/2010 | Schulz | G01R 31/346 318/490 |

(Continued)

FOREIGN PATENT DOCUMENTS

JP    2012-039730 A    2/2012

*Primary Examiner* — Rina Duda
(74) *Attorney, Agent, or Firm* — Oliff PLC

(57) ABSTRACT

In a control apparatus for a rotating electric machine, a phase feedback gain is set such that first and second conditions are met. The first condition is that gain margin and phase margin in frequency characteristics of a first loop transfer function are ensured. The second condition is that a gain intersection angular frequency in frequency characteristics of the first loop transfer function is lower than respective resonance angular frequency in frequency characteristics of first and second transfer functions. An amplitude feedback gain is set such that third and fourth conditions are met. The third condition is that gain margin and phase margin in frequency characteristics of a second loop transfer function are ensured. The fourth condition is that a gain intersection angular frequency in frequency characteristics of a second loop transfer function is lower than respective resonance angular frequency in frequency characteristics of third and fourth transfer functions.

17 Claims, 13 Drawing Sheets

(56) References Cited

U.S. PATENT DOCUMENTS

2013/0249465 A1* 9/2013 Kirihara ............... H02P 29/00
318/632

* cited by examiner

GAIN IN AMPLITUDE CALCULATING UNIT

GAIN IN PHASE CALCULATING UNIT

GAIN IN AMPLITUDE CALCULATING UNIT

GAIN IN PHASE CALCULATING UNIT

CONTROL APPARATUS FOR ROTATING ELECTRIC MACHINE

CROSS-REFERENCE TO RELATED APPLICATION

This application is based on and claims the benefit of priority from Japanese Patent Application No. 2016-097452, filed May 13, 2016. The entire disclosure of the above application is incorporated herein by reference.

BACKGROUND

Technical Field

The present disclosure relates to a control apparatus for a rotating electric machine that is electrically connected to an inverter.

Related Art

As this type of control apparatus, a control apparatus that performs phase control to operate an inverter based on voltage phase is known. The voltage phase is the phase of a voltage vector of a voltage supplied to a rotating electric machine. Thus, feedback control is performed to control the torque of the rotating electric machine to a command torque. Here, a method disclosed in JP-A-2012-39730 is known as a method for setting feedback gain used in feedback control. This method uses a model of a single-input single-output rotating electric machine of which the input is voltage phase and the output is torque. Specifically, in this method, the gain is set through approximation of a transfer function indicating frequency characteristics of the rotating electric machine to a constant, based on a relationship between torque and voltage phase while the rotating electric machine is in a steady state, during rectangular-wave drive of the rotating electric machine.

Some control apparatuses for rotating electric machines perform phase amplitude control. In phase amplitude control, the inverter is operated based on phase amplitude, in addition to the voltage phase. The phase amplitude is the magnitude of the voltage vector. In cases in which phase amplitude control is performed, interference may occur between command current control based on the voltage amplitude and torque control based on the voltage phase. Torque controllability in the rotating electric machine may decrease. The method for setting the feedback gain described in JP-A-2012-39730, which is based on the presumption of a single input and a single output, cannot be applied to a configuration in which the mutual interference occurs.

SUMMARY

It is thus desired to provide a control apparatus for a rotating electric machine that is capable of preventing decrease in torque controllability during phase amplitude control.

An exemplary embodiment of the present disclosure provides a control apparatus for a rotating electric machine that is electrically connected to an inverter. The control apparatus includes, a phase calculating unit, an amplitude calculating unit, and a control unit. The phase calculating unit calculates a voltage phase that is a phase of a voltage vector of a voltage applied to the rotating electric machine, as a manipulated variable for performing feedback control to control a torque of the rotating electric machine to a command torque. The amplitude calculating unit calculates a voltage amplitude (Vr) that is a magnitude of the voltage vector, as a manipulated variable for performing feedback control to control a current flowing to the rotating electric machine to a command current ($I\lambda^*$) corresponding to the command torque. The control unit controls the torque to the command torque by operating the inverter based on the voltage phase and the voltage amplitude. In the rotating electric machine, the voltage vector is controlled such that maximum torque is realized at an optimal current condition, such as a minimum amount of current, within a range enabling the command torque to be actualized.

The control apparatus includes: a phase gain setting unit and an amplitude gain setting unit.

The phase gain setting unit sets a phase feedback gain used for feedback control of the phase calculating unit such that a first condition and a second condition are met. The first condition is that a gain margin and a phase margin in frequency characteristics of a first loop transfer function are ensured. The second condition is that a gain intersection angular frequency in frequency characteristics of the first loop transfer function is lower than respective resonance angular frequency in frequency characteristics of a first transfer function and a second transfer function.

The first loop transfer function is a loop transfer function of which an input is the voltage phase and an output is the torque or a value obtained by a high frequency component being removed from the torque. The loop transfer function includes a transfer function for feedback control of the phase calculating unit and a phase-side transfer function. The phase-side transfer function is a transfer function that expresses frequency characteristics of the rotating electric machine of which an input is the voltage phase and an output is the torque. The transfer function includes the first transfer function and the second transfer function. The first transfer function is a transfer function that expresses frequency characteristics of the rotating electric machine of which an input is the voltage phase and an output is the torque. The second transfer function is a transfer function that expresses frequency characteristics of the rotating electric machine of which an input is the voltage amplitude and an output is the torque.

The amplitude gain setting unit sets an amplitude feedback gain used for feedback control of the amplitude calculating unit such that a third condition and a fourth condition are met. The third condition is that a gain margin and a phase margin in frequency characteristics of a second loop transfer function are ensured. The fourth condition is that a gain intersection angular frequency in frequency characteristics of the second loop transfer function is lower than respective resonance angular frequency in frequency characteristics of a third transfer function and a fourth transfer function.

The second loop transfer function is a loop transfer function of which an input is the voltage amplitude and an output is the command current or a value obtained by a high frequency component being removed from the command current. The loop transfer function includes a transfer function for feedback control of the amplitude calculating unit and an amplitude-side transfer function. The amplitude-side transfer function is a transfer function that expresses frequency characteristics of the rotating electric machine of which an input is the phase amplitude and an output is the command current. The transfer function includes the third transfer function and the fourth transfer function. The third transfer function is a transfer function that expresses frequency characteristics of the rotating electric machine of which an input is the voltage phase and an output is the command current. The fourth transfer function is a transfer function that expresses frequency characteristics of the rotating electric machine of which an input is the voltage amplitude and an output is the command current.

In the above-described disclosure, the following transfer function is defined as the phase-side transfer function. The transfer function expresses frequency characteristics of the rotating electric machine of which the input is the voltage phase and the output is the torque of the rotating electric machine, and includes the first transfer function and the second transfer function.

In a low frequency range in which the frequencies of the voltage phase and the command current during phase amplitude control of the rotating electric machine are lower than the resonance angular frequencies of the first and second transfer functions, the gain frequency characteristics and the phase frequency characteristics of the first and second transfer functions do not significantly change in relation to the frequency changes of the voltage phase or the command current serving as the input. Therefore, the gain frequency characteristics and the phase frequency characteristics of the phase-side transfer function including the first and second transfer functions do not significantly change based on the magnitude of the frequencies of the voltage phase and command current in the low frequency range.

Meanwhile, in the above-described disclosure, the following transfer function is defined as the amplitude-side transfer function. The transfer function expresses the frequency characteristics of the rotating electric machine of which the input is the voltage amplitude and the output is the command current, and includes the third and fourth transfer functions.

In a low frequency range in which the frequencies of the voltage phase and the command current during phase amplitude control are lower than the resonance angular frequencies of the third and fourth transfer functions, the gain frequency characteristics and the phase frequency characteristics of the third and fourth transfer functions do not significantly change in relation to the frequency changes of the voltage phase or the command current serving as the input. Therefore, the gain frequency characteristics and the phase frequency characteristics of the amplitude-side transfer function including the third and fourth transfer functions do not significantly change based on the magnitude of the frequencies of the voltage phase and command current in the low frequency range.

The effects of mutual interference between the command current control based on the voltage amplitude and the torque control based on the voltage phase can be suppressed through use of the above-described frequency characteristics of the phase-side transfer function and the amplitude-side transfer function. As a result of the effects of mutual interference being suppressed, the first loop transfer function including the phase-side transfer function and the second loop transfer function including the amplitude-side transfer function can be designed independently from each other. The feedback gains enabling prevention of decrease in torque controllability can be separately designed.

In the above-described disclosure, the phase feedback gain used for feedback control of the phase calculating unit is set by the phase gain setting unit such that a first condition and a second condition are met. The first condition is that the gain margin and the phase margin in the frequency characteristics of the first loop transfer function are ensured. The second condition is that the gain intersection angular frequency in the frequency characteristics of the first loop transfer function is lower than the respective resonance angular frequency in the frequency characteristics of the first and second transfer functions. In addition, the amplitude feedback gain used for feedback control of the amplitude calculating unit is set by the amplitude gain setting unit such that a third condition and a fourth condition are met. The third condition is that the gain margin and the phase margin in the frequency characteristics of the second loop transfer function are ensured. The fourth condition is that the gain intersection angular frequency in the frequency characteristics of the second loop transfer function is lower than the respective resonance angular frequency in the frequency characteristics of the third and fourth transfer functions. As a result of torque control being performed based on the feedback gains set in this manner, decrease in torque controllability during phase amplitude control can be prevented.

DESCRIPTION OF THE EMBODIMENTS

First Embodiment

A first embodiment implementing a control apparatus of the present disclosure will hereinafter be described with reference to the drawings. The control apparatus according to the present embodiment is applied to a three-phase inverter that is connected to a three-phase rotating electric machine. The control apparatus and the rotating electric machine are mounted to a vehicle, such as an electric car or a hybrid car.

Figure 1:
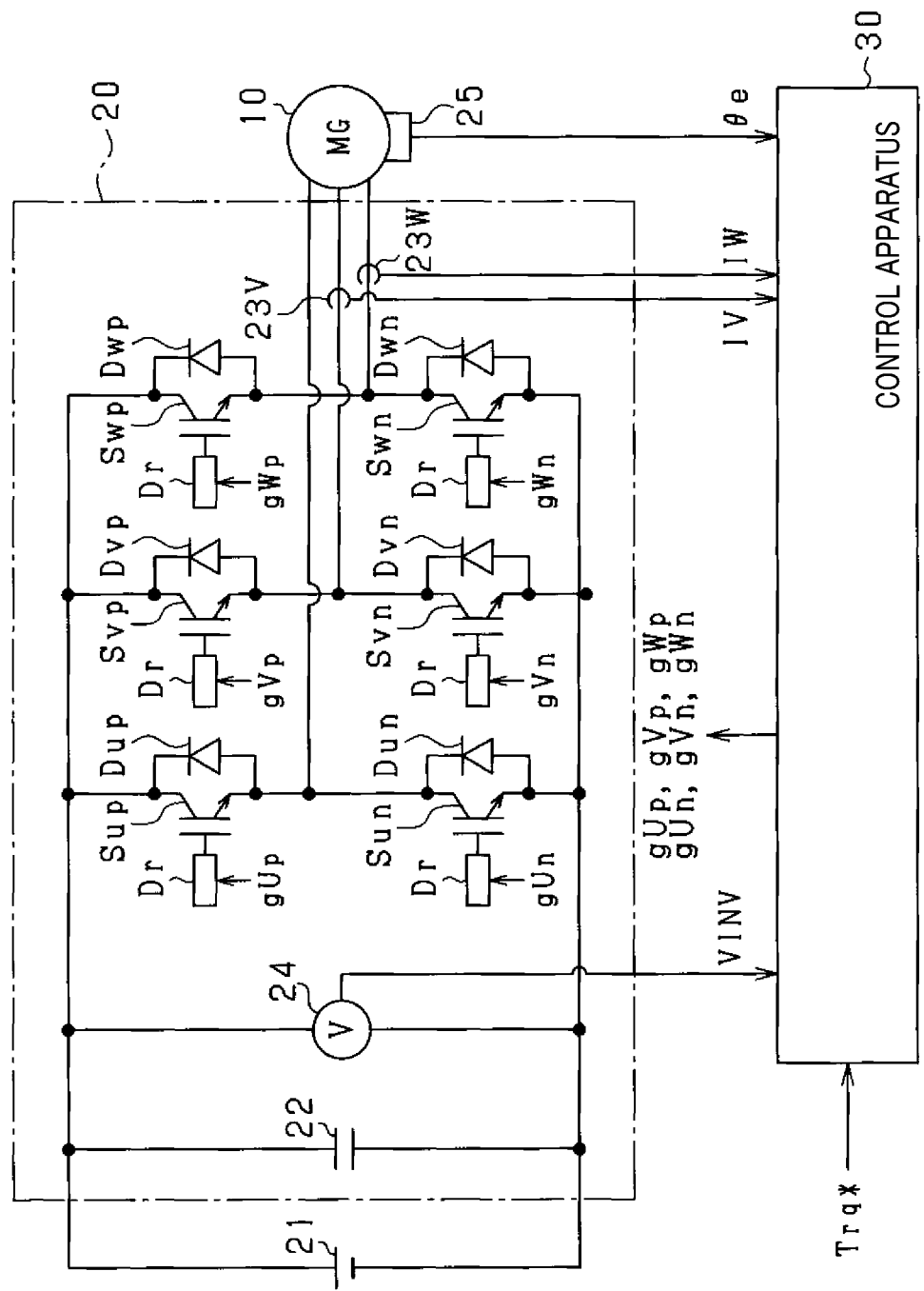
FIG. 1 is a diagram of an overall configuration of a motor control system according to a first embodiment.

As shown in FIG. 1, a motor control system includes a motor generator 10, a three-phase inverter 20, and a control apparatus 30. According to the present embodiment, the motor generator 10 is an on-board main machine. A rotor (not shown) of the motor generator 10 is capable of performing power transmission with a drive wheel. According to the present embodiment, a synchronous motor is used as the motor generator 10. More specifically, an interior permanent magnet synchronous motor (IPMSM) is used.

The motor generator 10 is connected to a battery 21, via the inverter 20. The battery 21 serves as a direct-current power supply. An output voltage of the battery 21 is, for example, 100 volts or greater. A smoothing capacitor 22 is provided between the battery 21 and the inverter 20. The smoothing capacitor 22 smoothens an input voltage of the inverter 20. Here, when the control system is provided with a boost converter that boosts the output voltage of the battery 21 and outputs the boosted voltage to the inverter 20, the boost converter corresponds to the direct-current power supply.

The inverter 20 includes a series-connection body for each phase. The series-connection body is composed of upper arm switches Sup, Svp, and Swp, and lower arm switches Sun, Svn, and Swn. Each series-connection body is connected in parallel to the battery 21. A connection point between U-phase upper and lower arm switches Sup and Sun is connected to a U-phase of the motor generator 10. A connection point between V-phase upper and lower arm switches Svp and Svn is connected to a V-phase of the motor generator 10. A connection point between W-phase upper and lower switches Swp and Swn is connected to a W-phase of the motor generator 10. According to the present embodiment, voltage-control type semiconductor switching elements are used as the switches Sup, Sun, Svp, Svn, Swp, and Swn. More specifically, insulated-gate bipolar transistors (IGBTs) are used. Freewheeling diodes Dup, Dun, Dvp, Dvn, Dwp, and Dwn are respectively connected in reverse parallel to the switches Sup, Sun, Svp, Svn, Swp, and Swn.

The motor control system further includes a phase current detecting unit. The phase current detecting unit detects currents of at least two phases, among phase currents flowing to the motor generator 10. According to the present embodiment, the phase current detecting unit includes a V-phase current detecting unit 23V and a W-phase current detecting unit 23W. The V-phase current detecting unit 23V detects the current flowing to the V phase of the motor generator 10. The W-phase current detecting unit 23W detects the current flowing to the W phase of the motor generator 10. In addition, the motor control system includes a voltage detecting unit 24 and an angle detecting unit 25. The voltage detecting unit 24 detects the output voltage of the battery 21 as a power supply voltage VINV of the inverter 20. The angle detecting unit 25 detects an electrical angle θe of the motor generator 10. For example, a resolver can be used as the angle detecting unit 25.

The detection values of the various detecting units are inputted to the control apparatus 30, via an analog-to-digital (AD) converter (not shown) and the like. The control apparatus 30 is mainly configured by a microcomputer. The control apparatus 30 operates the inverter 20 such as to perform feedback control to control the torque of the motor generator 10 to a command torque Trq*. The control apparatus 30 generates operating signals gUp, gUn, gVp, gVn, gWp, and gWn based on the detection values from the various detecting units, described above, to turn On and OFF the switches Sup, Sun, Svp, Svn, Swp, and Swn configuring the inverter 20. The control apparatus 30 then outputs the generated operating signals gUp, gUn, gVp, gVn, gWp, and gWn to drive circuits Dr that respectively correspond to the switches Sup, Sun, Svp, Svn, Swp, and Swn. Here, the operating signals gUp, gVp, and gWp for the upper arm side and the corresponding operating signals gUn, gVn, and gWn for the lower arm side are mutually complementary signals. That is, the upper arm switch and the corresponding lower arm switch are alternately set to the ON state. The command torque Trq* is outputted from, for example, a control apparatus that is provided outside of the control apparatus 30 and is of a higher order than the control apparatus 30.

Next, torque control of the motor generator 10 performed by the control apparatus 30 will be described with reference to FIG. 2.

A two-phase converting unit 30a converts a U-phase current IU, a V-phase current IV, and a W-phase current IW on a three-phase fixed coordinate system of the motor generator 10 to d- and q-axis currents Idc and Iqc on a dq-axis coordinate system. The dq-axis coordinate system is a two-phase rotary coordinate system. The two-phase converting unit 30a performs the conversion based on the V-phase current IV detected by the V-phase current detecting unit 23V, the W-phase current IW detected by the W-phase current detecting unit 23W, and the electrical angle θe.

A filtering unit 30b performs a filtering process on the d- and q-axis currents Idc and Iqc outputted from the two-phase converting unit 30a to remove frequency components in an attenuation range. The filtering unit 30b then outputs d- and q-axis currents Idr and Iqr.

A torque estimating unit 30c calculates an estimated torque Te of the motor generator 10 based on the d- and q-axis currents Idr and Iqr outputted from the filtering unit 30b. Here, the estimated torque Te may be calculated using a model formula or a map associating the d- and q-axis currents Idr and Iqr with the estimated torque Te.

A torque deviation calculating unit 30d calculates a torque deviation ΔT by subtracting the estimated torque Te from the command torque Trq*.

A phase calculating unit 30e calculates a voltage phase δ based on the torque deviation ΔT calculated by the torque deviation calculating unit 30d. The voltage phase δ serves as a manipulated variable that is used for feedback control to control the estimated torque Te to the command torque Trq*. The voltage phase δ is the phase of a voltage vector Vnvt of the inverter 20. According to the present embodiment, the voltage phase δ is calculated by proportional-integral control in which the torque deviation ΔT is the input, as shown in an expression (eq1) below.

$$\delta = Kp\delta \cdot \Delta T + Ki\delta \int \Delta T \cdot dt \quad (eq1)$$

In the expression (eq1) above, Kpδ denotes a first proportional gain and Kiδ denotes a first integral gain. According to the present embodiment, the first proportional gain Kpδ and the first integral gain Kiδ correspond to phase feedback gain.

According to the present embodiment, with a positive direction of the d axis as reference, a counter-clockwise direction from the reference is defined as a positive direction of the voltage phase δ.

A command current calculating unit 30f calculates d- and q-axis command currents Id* and Iq* based on the command torque Trq*. The d- and q-axis command currents Id* and Iq* are used to actualize the command torque Trq*. According to the present embodiment, currents for actualizing minimum current maximum torque control (maximum torque per ampere control) are calculated as the d- and q-axis command currents Id* and Iq*.

A λ-axis setting unit 30g calculates an angle θλ based on d- and q-axis inductances Ld and Lq of the motor generator 10 and the voltage phase δ calculated by the phase calculating unit 30e. The angle θλ is an angle formed by the d axis and a λ axis on the dq-axis coordinate system. The λ axis will be described below.

A voltage equation of the permanent magnet synchronous motor is expressed by an expression (eq2) below.

$$\begin{bmatrix} Vd \\ Vq \end{bmatrix} = \begin{bmatrix} p \cdot Ld + R & -\omega e \cdot Lq \\ \omega e \cdot Ld & p \cdot Lq + R \end{bmatrix} \begin{bmatrix} Id \\ Iq \end{bmatrix} + \begin{bmatrix} 0 \\ \omega e \cdot \Psi \end{bmatrix} \quad (\text{eq 2})$$

In the expression (eq2) above: p denotes a differential operator; R denotes armature winding resistance; Ωe denotes an electrical angle frequency of the motor generator; and ψ denotes a root-mean-square of an armature interlinkage flux of the permanent magnet configuring the rotor. In the expression (eq2) above, when a steady state in which a rotation frequency of the motor generator 10 is fixed is assumed and a condition that a transient phenomenon is ignored is applied, p=0. In addition, a condition that the rotation frequency of the motor generator 10 is sufficiently high and relationships expressed by R<<ωexLd and R<<ωexLq are established is applied to the expression (eq2) above. From this, the expression (eq2) above is expressed by an expression (eq3) below.

$$\begin{bmatrix} Vd \\ Vq \end{bmatrix} = \begin{bmatrix} 0 & -\omega e \cdot Lq \\ \omega e \cdot Ld & 0 \end{bmatrix} \begin{bmatrix} Id \\ Iq \end{bmatrix} + \begin{bmatrix} 0 \\ \omega e \cdot \Psi \end{bmatrix} \quad (\text{eq 3})$$

A relationship between d- and q-axis voltages Vd and Vq, and the voltage phase δ and a voltage amplitude Vr is expressed by an expression (eq4) below.

$$\begin{bmatrix} Vd \\ Vq \end{bmatrix} = \begin{bmatrix} Vr \cdot \cos\delta \\ Vr \cdot \sin\delta \end{bmatrix} \quad (\text{eq 4})$$

Here, the voltage amplitude Vr refers to the magnitude of the voltage vector Vnvt. Specifically, the voltage amplitude Vr is defined as a square root of a sum of a square of the d-axis voltage Vd and a square of the q-axis voltage Vq. The d-axis voltage Vd is a d-axis component of the voltage vector Vnvt. The q-axis voltage Vq is a q-axis component of the voltage vector Vnvt.

Here, a voltage equation when the voltage phase δ changes by only a minute amount Δδ is expressed by an expression (eq5) below, using the expressions (eq3) and (eq4) above. Hereafter, the foregoing minute amount Δδ is referred to as a phase minute change amount.

$$\begin{bmatrix} Vd\delta \\ Vq\delta \end{bmatrix} = \begin{bmatrix} 0 & -\omega e \cdot Lq \\ \omega e \cdot Ld & 0 \end{bmatrix} \begin{bmatrix} Id\delta \\ Iq\delta \end{bmatrix} + \begin{bmatrix} 0 \\ \omega e \cdot \Psi \end{bmatrix} \quad (\text{eq 5})$$

where, $Vd\delta = Vr \cos(\delta + \Delta\delta) = Vr(\cos\delta \cos\Delta\delta - \sin\delta \sin\Delta\delta) \approx Vd - \Delta\delta \cdot Vr \sin\delta$ $Vq\delta = Vr \sin(\delta + \Delta\delta) = Vr(\sin\delta \cos\Delta\delta + \cos\delta \sin\Delta\delta) \approx Vq + \Delta\delta \cdot Vr \cos\delta$ When the expression (eq3) above is subtracted from the expression (eq5) above, an expression (eq6) below is derived.

$$\begin{bmatrix} Vd\delta - Vd \\ Vq\delta - Vq \end{bmatrix} = \begin{bmatrix} 0 & -\omega e \cdot Lq \\ \omega e \cdot Ld & 0 \end{bmatrix} \begin{bmatrix} Id\delta - Id \\ Iq\delta - Iq \end{bmatrix} \quad (\text{eq 6})$$

In the expression (eq6) above, Idδ−Id on the right side indicates a d-axis current change amount ΔIdδ. Iqδ−Iq indicates a q-axis current change amount ΔIqδ. When the expression (eq6) above is solved for the current change amounts ΔIdδ and ΔIqδ, an expression (eq7) below is derived.

$$\begin{bmatrix} \Delta Id\delta \\ \Delta Iq\delta \end{bmatrix} = \begin{bmatrix} 0 & -\omega e \cdot Lq \\ \omega e \cdot Ld & 0 \end{bmatrix}^{-1} \begin{bmatrix} Vd\delta - Vd \\ Vq\delta - Vq \end{bmatrix} = \frac{Vr}{\omega e} \begin{bmatrix} \frac{\cos\delta}{Ld} \\ \frac{\sin\delta}{Lq} \end{bmatrix} \Delta\delta \quad (\text{eq 7})$$

Figure 3:
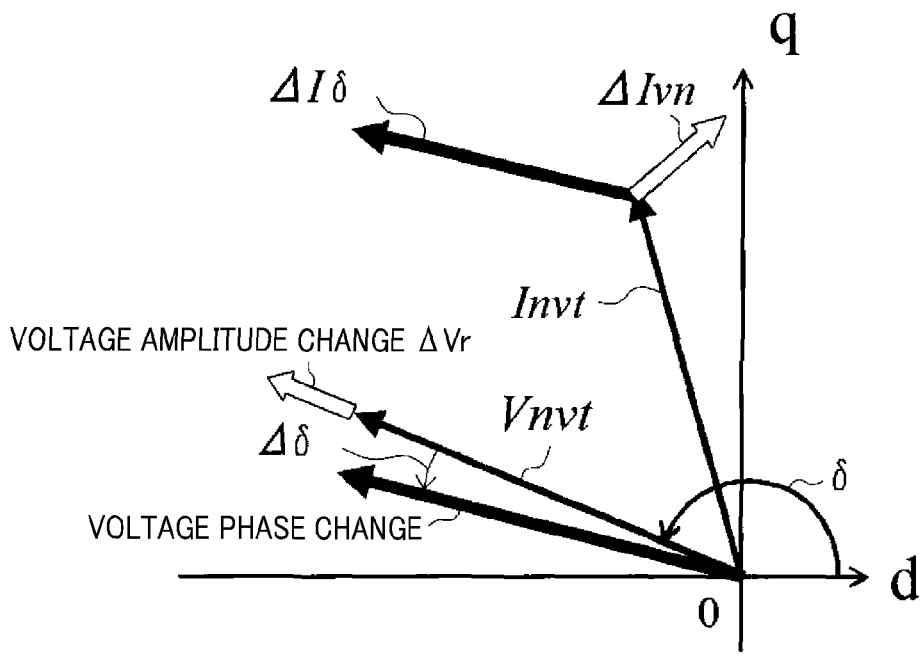
FIG. 3 is a diagram of changes in a current vector accompanying changes in a voltage vector.

FIG. 3 shows the voltage vector Vnvt and a current vector Invt on the dq-axis coordinate system. In FIG. 3, a change in the current vector Invt when the voltage phase δ changes by the phase minute change amount Δδ is indicated by ΔIδ. In addition, a change in the current vector Invt when the voltage amplitude Vr changes by a minute amount ΔVr is indicated by ΔIvn. Hereafter, the foregoing minute amount ΔVr is referred to as amplitude minute change amount.

Figure 4:
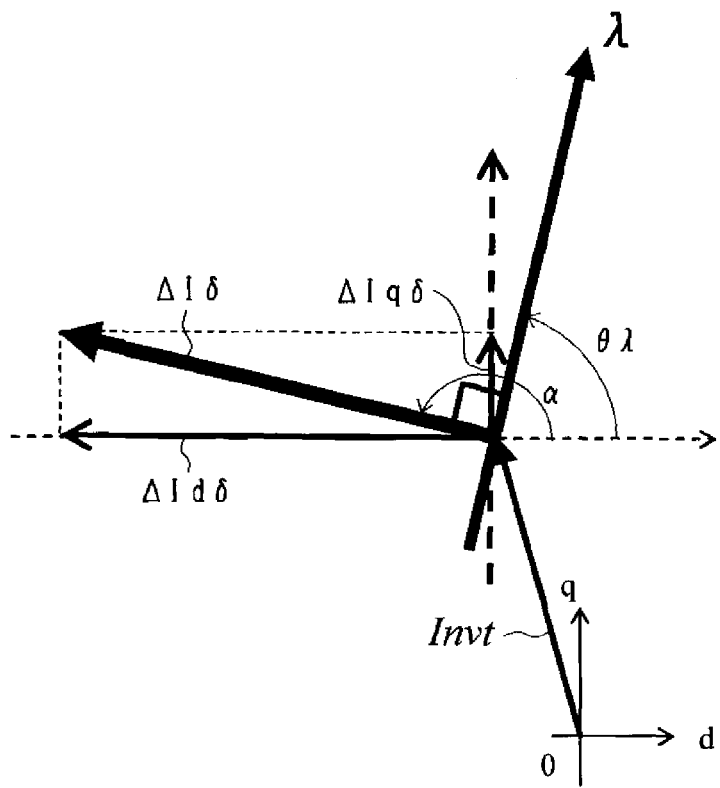
FIG. 4 is a diagram of a method for calculating an angle formed by a d axis and a λ axis.

FIG. 4 is an enlarged view of the changes in the current vector Invt. A change direction α of the current vector Invt in relation to the d axis when the voltage phase δ is minutely changed by the expression (eq7) above is expressed by an expression (eq8) below.

$$\alpha = \text{Tan}^{-1}\left(\frac{\Delta Iq\delta}{\Delta Id\delta}\right) = \text{Tan}^{-1}\left(\frac{Ld}{Lq}\tan\delta\right) \quad (\text{eq 8})$$

Figure 5:
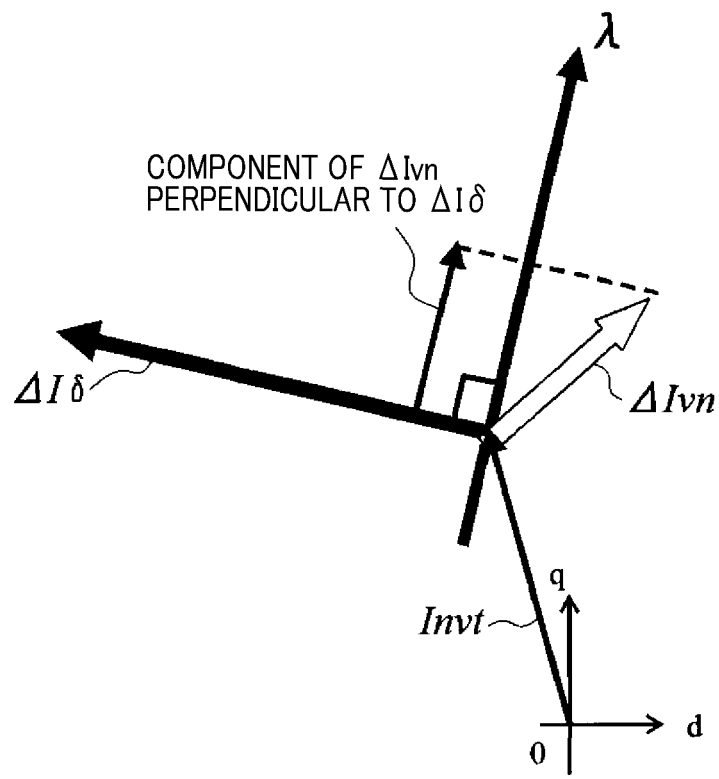
FIG. 5 is a diagram for explaining the λ axis.

For example, the change direction α can be calculated between −π and +π by an arctangent operation as in the expression (eq8) above. Here, in FIG. 5, a coordinate axis that extends in a direction perpendicular to the change direction α of the current vector Invt is indicated as being the λ axis that is a non-interfering axis. That is, the λ axis is a coordinate axis in a direction in which the change in the current vector Invt when the voltage phase δ minutely changes is zero. Of the change ΔIvn in the current vector Invt when the voltage amplitude Vr changes by only the amplitude minute change amount ΔVr, the λ-axis component in which the change ΔIvn is mapped onto the λ axis is a non-interference current that is unaffected by the change in the voltage phase δ. According to the present embodiment, this current is used as a λ-axis current Iλ in the calculation for the voltage amplitude Vr. Here, the angle θλ formed by the d axis and the λ axis, which is a parameter necessary for setting the λ axis, is expressed by an expression (eq9) below.

$$\theta\lambda = \alpha - \frac{\pi}{2} = \text{Tan}^{-1}\left(\frac{Ld}{Lq}\tan\delta\right) - \frac{\pi}{2} \qquad \text{(eq 9)}$$

Figure 2:
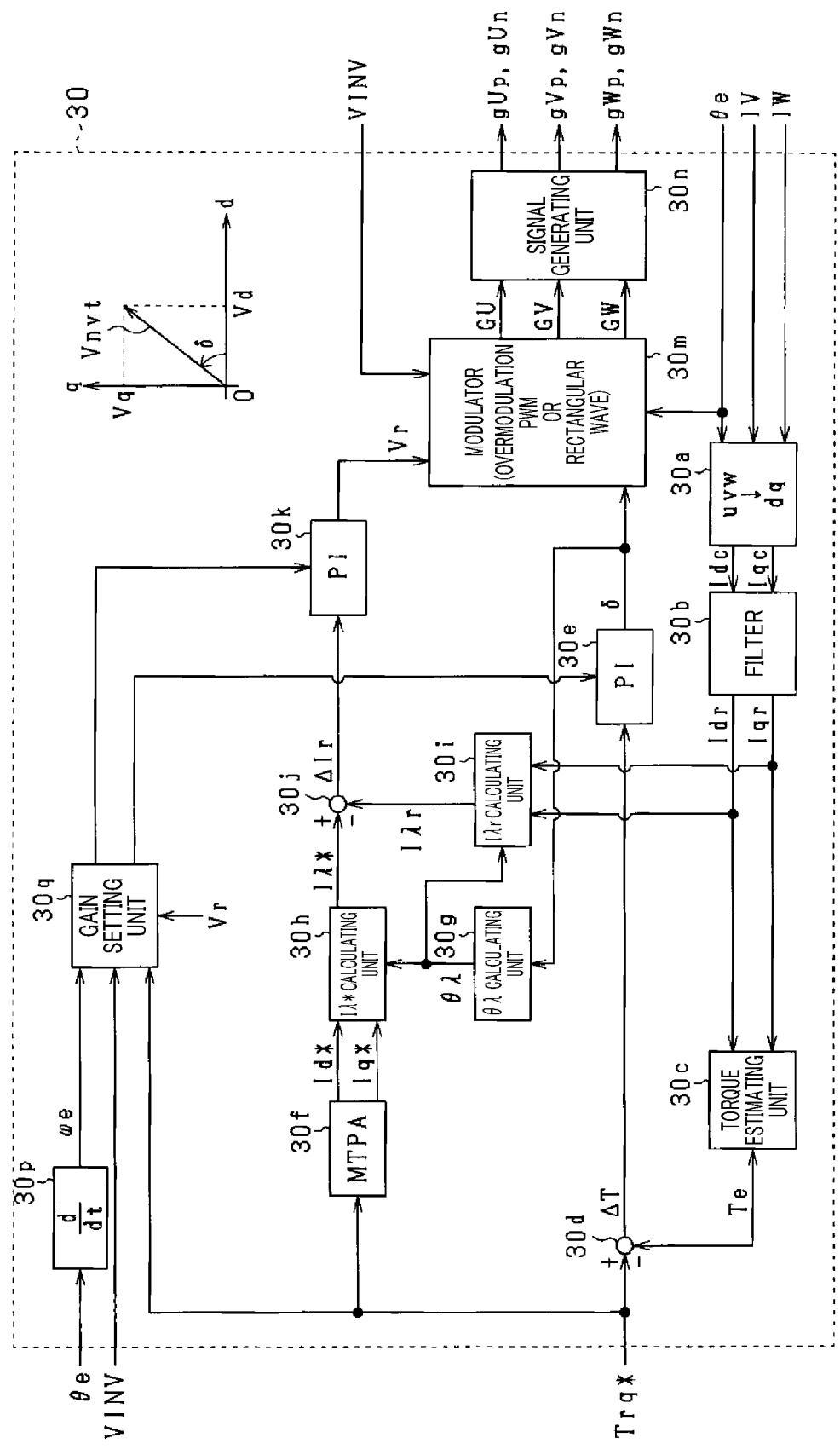
FIG. 2 is a functional block diagram of a motor control process.

Returning to the description of FIG. 2 given above, the λ-axis setting unit 30g calculates the angle θλ formed by the d axis and the λ axis based on the expression (eq9) above.

A λ-axis command current calculating unit 30h calculates a λ-axis command current Iλ* based on the command currents Id* and Iq* outputted from the command current calculating unit 30f, and the angle θλ calculated by the λ-axis setting unit 30g, using an expression (eq10) below.

$$I\lambda^* = Id^* \cdot \cos\theta\lambda + Iq^* \cdot \sin\theta\lambda \qquad \text{(eq10)}$$

Figure 6:
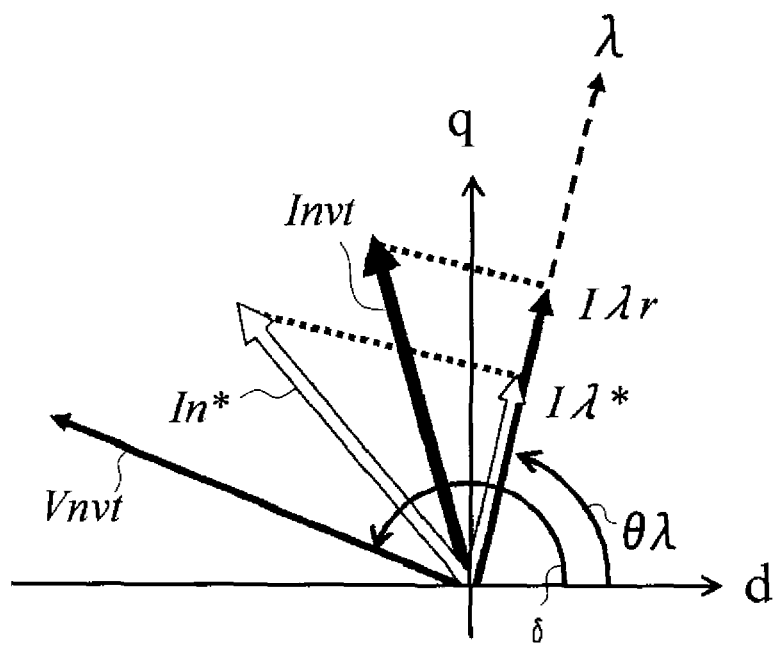
FIG. 6 is a diagram of a method for calculating a λ-axis current.

FIG. 6 shows a calculation aspect for the λ-axis command current Iλ. In FIG. 6, a command current vector specified by the d- and q-axis command currents Id* and Iq* is indicated by In*. A current vector is indicated by Invt.

A λ-axis actual current calculating unit 30i calculates a λ-axis current Iλr based on the d- and q-axis currents Idr and Iqr outputted from the filtering unit 30b, and the angle θλ calculated by the λ-axis setting unit 30g, using an expression (eq11) below.

$$I\lambda r = Idr \cdot \cos\theta\lambda + Iqr \cdot \sin\theta\lambda \qquad \text{(eq11)}$$

A λ-axis current deviation calculating unit 30j calculates a λ-axis current deviation ΔIr by subtracting the λ-axis current Iλr from the λ-axis command current Iλ*

An amplitude calculating unit 30k calculates the voltage amplitude Vr based on the λ-axis current deviation ΔIr. Specifically, the amplitude calculating unit 30k calculates the voltage amplitude Vr as a manipulated variable for performing feedback control to control the λ-axis current Iλr to the λ-axis command current Iλ*. According to the present embodiment, proportional-integral control is used as the feedback control, as shown in an expression (eq12) below.

$$Vr = Kpv \cdot \Delta Ir + Kiv \int \Delta Ir \cdot dt \qquad \text{(eq12)}$$

In the expression (eq12) above, Kpv denotes a second proportional gain and Kiv denotes a second integral gain. According to the present embodiment, the second proportional gain Kpv and the second integral gain Kiv correspond to an amplitude feedback gain.

A modulator 30m calculates command voltages GU, GV, and GW of the U, V, and W phases based on the voltage amplitude Vr calculated by the amplitude calculating unit 30k, the voltage phase δ calculated by the phase calculating unit 30e, the electrical angle θe, and the power supply voltage VINV. The phases of the command voltages GU, GV, and GW are shifted from each other by an electrical angle of 120 degrees.

According to the present embodiment, the modulator 30m switches between, and performs, phase amplitude control and phase control to control the estimated torque Te to the command torque Trq*. In phase amplitude control, both the voltage phase δ and the voltage amplitude θ are subject to manipulation. In phase control, only the voltage phase δ is subject to manipulation.

During phase amplitude control, sine wave pulse width modulation (PWM) control or overmodulation PWM control is performed. Sine wave PWM control is control performed to operate the inverter 20 such that the output voltage of the inverter 20 is a sine wave that changes at the electrical angular frequency ωe, when a modulation factor Mr is less than a first modulation factor Ma. The modulation factor Mr is a value obtained by the voltage amplitude Vr being normalized by the power supply voltage VINV. Sine wave control is performed when peak values of the command voltages GU, GV, and GW are ½ of the power supply voltage VINV or lower. For example, the first modulation factor Ma is set to 100%.

The modulation factor Mr may be calculated based on an expression (eq13) below.

$$Mr = \frac{1}{\sqrt{1.5}} \frac{Vr}{\frac{VINV}{2}} \times 100 \qquad \text{(eq 13)}$$

Overmodulation PWM control is control performed to operate the inverter 20, while compensating for insufficiency in the voltage actually applied to the motor generator 10 in relation to the command voltages GU, GV, and GW, when the peak values of the command voltages GU, GV, and GW exceed ½ of the power supply voltage VINV. Overmodulation PWM control is performed when the modulation factor Mr is the first modulation factor Ma or greater and less than a second modulation factor Mb (>Ma).

Figure 7:
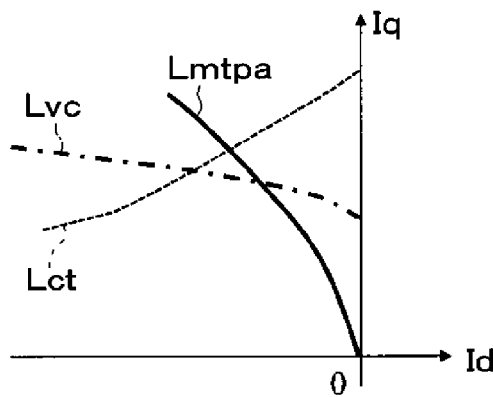
FIG. 7 is a diagram of a trajectory (locus) of the current vector, a constant voltage ellipse, and a constant torque curve during maximum torque per ampere control.

As shown in FIG. 7, when phase amplitude control is performed, the actual current vector moves on an MTPA line Lmtpa. The MTPA line Lmtpa is a trajectory (locus) of the d- and q-axis currents Id and Iq that is determined by maximum torque per ampere control. The actual current vector is positioned at the intersection between the MTPA line Lmtpa and a constant torque curve corresponding to the command torque Trq*.

Meanwhile, during phase control, rectangular wave control is performed. Rectangular wave control is control in which, during a single electrical angle cycle of the motor generator 10, a period over which the upper arm switch is turned ON and a period over which the lower arm switch is turned ON each occur once. In rectangular wave control, the modulation factor is fixed at the second modulation factor Mb. Therefore, only the voltage phase δ is a manipulated variable.

As shown in FIG. 7, when phase control is performed, the actual current vector moves on a constant voltage ellipse Lvc. The constant voltage ellipse Lvc is a trajectory (locus) of the d- and q-axis currents Id and Iq that is possible when only the voltage phase δ is manipulated. The actual current vector is positioned at the intersection between the constant voltage ellipse Lvc and the constant torque curve corresponding to the command torque Trq*.

Returning to the description of FIG. 2 given above, a signal generating unit 30n generates the operating signals gUp, gUn, gVp, gVn, gWp, and gWn based on the command voltages GU, GV, and GW of the three phases outputted from the modulator 30m. The signal generating unit 30n then outputs the operating signals gUp, gUn, gVp, gVn, gWp, and gWn to the drive circuits Dr. The signal generating unit 30n may generate the operating signals gUp, gUn, gVp, gVn, gWp, and gWn by, for example, triangular wave comparison PWM control that is based on a comparison of magnitude between the command voltages GU, GV, and GW, and a carrier signal of a triangular wave signal or the like. Instead of the operating signals being generated based on the carrier signal, the operating signal may be generated based on a pulse pattern.

A speed calculating unit 30p calculates the electrical angular frequency ωe of the motor generator 10 based on the electrical angle θe.

A gain setting unit 30q sets the first proportional gain Kpδ, the first integral gain Kiδ, the second proportional gain Kpv, and the second integral gain Kiv based on the electrical angular frequency ωe, the power supply voltage VINV, the command torque Trq*, and the voltage amplitude Vr. A design technique of the gains, followed by a process for setting the gains by the gain setting unit 30q, will be described below.

First, the design technique of the gains will be described.

Figure 8:
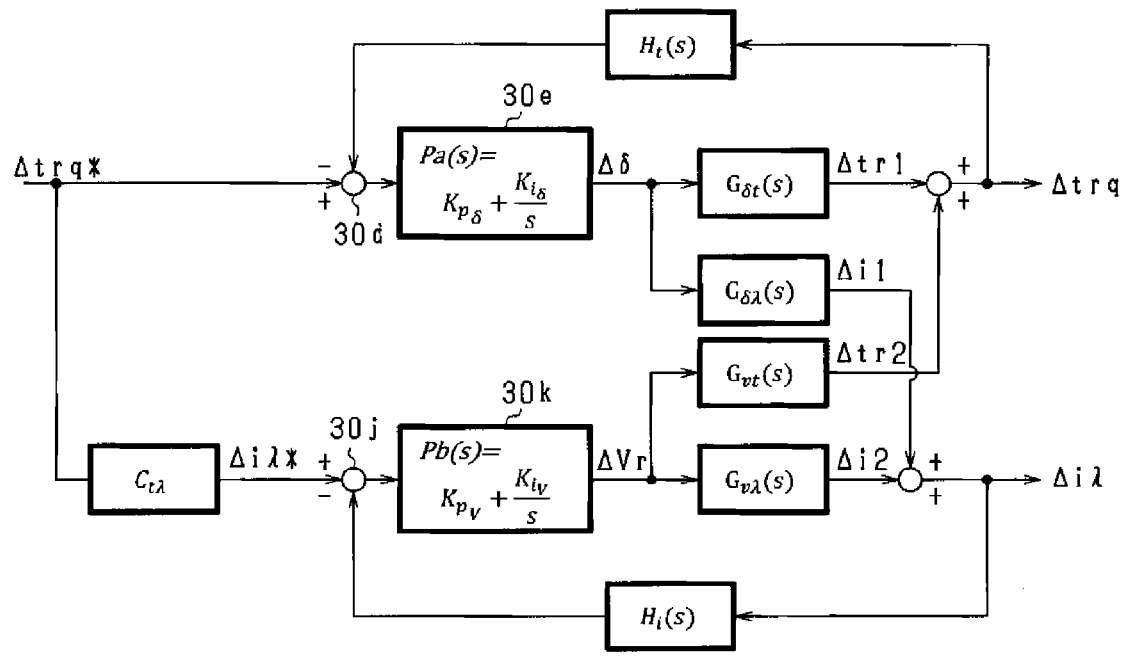
FIG. 8 is a block diagram of a torque feedback control system.
Figure 9A:
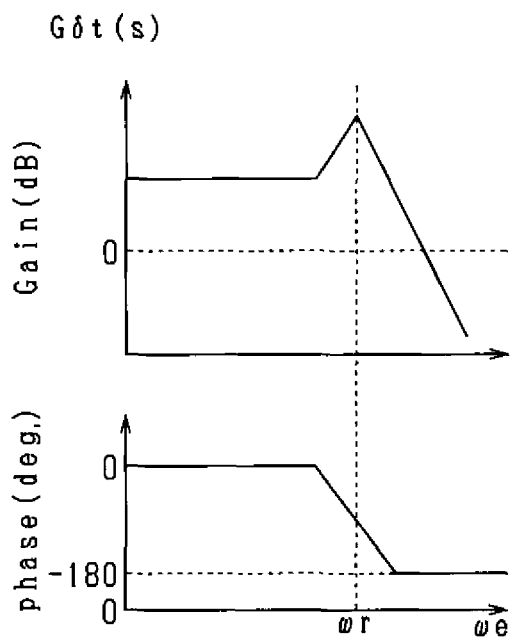
FIGS. 9A to 9D are diagrams of frequency characteristics of transfer functions of a motor generator.
Figure 9B:
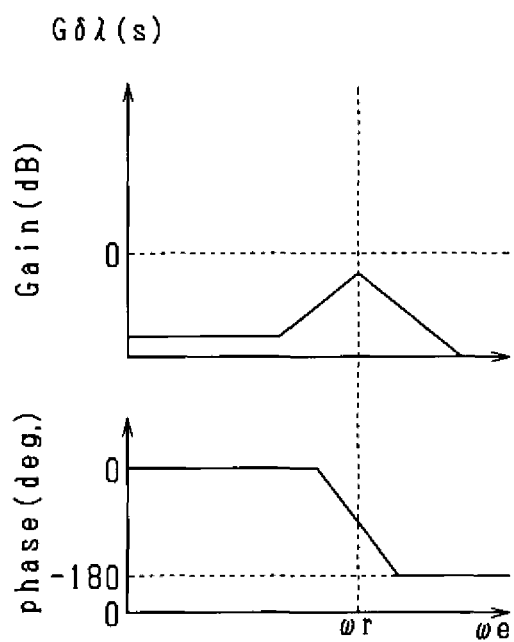
Figure 9C:
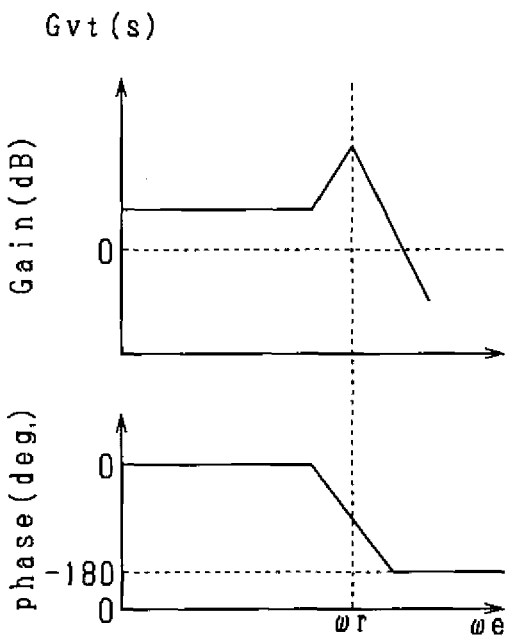
Figure 9D:
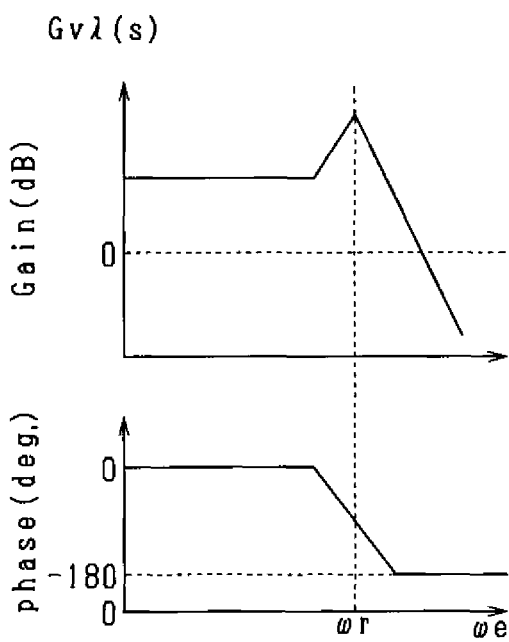

FIG. 8 shows a block diagram of a torque feedback control system. The control system is configured by transfer functions in which the control system shown in FIG. 2 is linearized near each operation point of the motor generator 10. According to the present embodiment, the operation point is specified by the power supply voltage of the inverter 20, and the torque and electrical angular frequency of the motor generator 10. In FIG. 8, the transfer function of the phase calculating unit 30e is indicated by Pa(s) and the transfer function of the amplitude calculating unit 30k is indicated by Pb(s).

In FIG. 8, a command torque change amount Δtrq* indicates a minute change amount of the command torque from an equilibrium point that is set to the current command torque Trq*.

A transfer function Ht(s) is a transfer function that expresses an observer and includes the filtering unit 30b. According to the present embodiment, the transfer function Ht(s) is a transfer function of a low-pass filter that is, for example, a first-order lag filter. The transfer function Ht(s) of the filter corresponds to a configuration within the control system, from the two-phase converting unit 30a to the torque deviation calculating unit 30d, via the filtering unit 30b.

The output of the transfer function Pa(s) of the phase calculating unit 30e is the phase minute change amount Δδ. The phase minute change amount Δδ corresponds to a value obtained by a voltage phase δ0 at the equilibrium point being subtracted from the current voltage phase δ. When the drive state of the motor generator 10 becomes the steady state, the current voltage phase δ converges to the voltage phase δ0 at the equilibrium point, and the phase minute change amount Δδ converges to zero.

A transfer function Ctλ is a transfer function of which the input is the command torque change amount Δtrq*, and the output is a minute change amount Δiλ* of the λ-axis command current Iλ* when the command torque Trq* changes by Δtrq*. The transfer function Ctλ corresponds to a configuration within the control system, from the command current calculating unit 30f to the λ-axis command current calculating unit 30h. According to the present embodiment, the transfer function Ctλ is not dependent on the frequency of the input signal and is dependent solely on the torque of the motor generator 10. When the command torque change amount Δtrq* converges to zero, the minute change amount Δiλ* of the λ-axis command current Iλ* converges to zero.

A transfer function Hi(s) is a transfer function that expresses an observer and includes the filtering unit 30b. According to the present embodiment, the transfer function Hi(s) is a transfer function of a low-pass filter that is, for example, a first-order lag filter. The transfer function Hi(s) of the filter corresponds to a configuration within the control system, from the two-phase converting unit 30a to the λ-axis current deviation calculating unit 30j, via the filtering unit 30b.

The output of the transfer function Pb(s) of the amplitude calculating unit 30k is the amplitude minute change amount ΔVr. The amplitude minute change amount ΔVr corresponds to a value obtained a voltage amplitude Vr0 at the equilibrium point being subtracted from the current voltage amplitude Vr. When the drive state of the motor generator 10 reaches a steady state, the current voltage amplitude Vr converges to the voltage amplitude Vr0 at the equilibrium point, and the amplitude minute change amount ΔVr converges to zero.

Among the transfer functions expressing the motor generator 10, a first transfer function Gδt(s) is that of which the input is the phase minute change amount Δδ and the output is a first torque change amount Δtr1. The first torque change amount Δtr1 is the torque change amount of the motor generator 10 when the voltage phase δ changes by the phase minute change amount Δδ. When the phase minute change amount Δδ converges to zero, the first torque change amount Δtr1 converges to zero.

Among the transfer functions expressing the motor generator 10, a second transfer function Gvt(s) is that of which the input is the amplitude minute change amount ΔVr and the output is a second torque change amount Δtr2. The second torque change amount Δtr2 is the torque change amount of the motor generator 10 when the voltage amplitude Vr changes by the amplitude minute change amount ΔVr. When the amplitude minute change amount ΔVr converges to zero, the second torque change amount Δtr2 converges to zero.

The value obtained by the first torque change amount Δtr1 and the second torque change amount Δtr1 being added is a total torque change amount Δtrq. The total torque change amount Δtrq is inputted to the torque deviation calculating unit 30d via the transfer function Ht(s) of the filter.

Among the transfer functions expressing the motor generator 10, a third transfer function Gδλ(s) is that of which the input is the phase minute change amount Δδ and the output is a first λ-axis current change amount Δi1. The first λ-axis current change amount Δi1 is the change amount of the λ-axis current when the voltage phase δ changes by the phase minute change amount Δδ. When the drive state of the motor generator 10 becomes the steady state and the phase minute change amount Δδ converges to zero, the first λ-axis current change amount Δi1 converges to zero.

Among the transfer functions expressing the motor generator 10, a fourth transfer function Gvλ(s) is that of which the input is the amplitude minute change amount ΔVr as the input and the output is a second λ-axis current change amount Δi2. The second λ-axis current change amount Δi2 is the change amount of the λ-axis current when the voltage amplitude Vr changes by the amplitude minute change amount ΔVr. When the drive state of the motor generator 10 becomes the steady state and the amplitude minute change amount ΔVr converges to zero, the second λ-axis current change amount Δi2 converges to zero.

The value obtained by the first λ-axis current change amount Δi1 and the second λ-axis current change amount Δi2 being added is a total λ-axis current change amount Δiλ. The total λ-axis current change amount Δiλ is inputted to the λ-axis current deviation calculating unit 30j via the transfer function Hi(s) of the filter.

Here, a transfer function of which the input is the phase minute change amount Δδ and the amplitude minute change amount ΔVr and the output is the total torque change amount Δtrq is expressed by an expression (eq14) below.

$$\Delta trq = \Delta tr1 + \Delta tr2 \qquad (\text{eq } 14)$$

-continued $$= G_{\delta t}(s)\Delta\delta + G_{vt}(s)\Delta V_r$$

In the expression (eq14) above, s denotes a Laplace operator. In addition, a transfer function of which the input is the phase minute change amount $\Delta\delta$ and the amplitude minute change amount $\Delta Vr$ and the output is the total $\lambda$-axis current change amount $\Delta i\lambda$ is expressed by an expression (eq15) below.

$$\Delta i\lambda = \Delta i1 + \Delta i2 \qquad (\text{eq 15})$$
$$= G_{\delta\lambda}(s)\Delta\delta + G_{v\lambda}(s)\Delta V_r$$

The expressions (eq14) and (eq15) above are expressed as expressions (eq16) and (eq17) below.

$$\frac{\Delta trq}{\Delta\delta} = G_{\delta t}(s) + G_{vt}(s)\frac{\Delta V_r}{\Delta\delta} \qquad (\text{eq 16})$$

$$\frac{\Delta i\lambda}{\Delta V_r} = G_{\delta\lambda}(s)\frac{\Delta\delta}{\Delta Vr} + G_{v\lambda}(s) \qquad (\text{eq 17})$$

Here, the voltage phase $\delta$ and the $\lambda$-axis current I$\lambda$ are non-interfering. Therefore, the gain frequency characteristics in the low-frequency range of the fourth transfer function Gv$\lambda$(s) is sufficiently smaller than 0 dB and can be ignored. Therefore, the expression (eq17) above can be expressed as an expression (eq18) below.

$$\frac{\Delta i\lambda}{\Delta V_r} = G_{v\lambda}(s) \qquad (\text{eq 18})$$

FIG. 9A to FIG. 9D show the frequency characteristics of the transfer functions G$\delta$t, G$\delta\lambda$, Gct, and Gv$\lambda$ when a predetermined operation point is the equilibrium point. As shown in FIG. 9A to FIG. 9D, the transfer functions G$\delta$t, G$\delta\lambda$, Gct, and Gv$\lambda$ have a resonance angular frequency near the electrical angular frequency. According to the present embodiment, resonance angular frequencies $\omega r$ of the transfer functions G$\delta$t, G$\delta\lambda$, Gct, and Gv$\lambda$ are the same angular frequency at each operation point of the motor generator 10.

In the transfer functions G$\delta$t, G$\delta\lambda$, Gct, and Gv$\lambda$, the gain is substantially fixed in the low frequency range that is sufficiently lower than the resonance angular frequency $\omega r$. In addition, in the transfer functions G$\delta$t, G$\delta\lambda$, Gct, and Gv$\lambda$, phase delay is zero or a value near zero in the low frequency range that is sufficiently lower than the resonance angular frequency $\omega r$. Therefore, according to the present embodiment, the transfer functions G$\delta$t, G$\delta\lambda$, Gct, and Gv$\lambda$ at each operation point can be considered constants in the low frequency range.

Here, when a condition that the drive state of the motor generator 10 is the steady state, that is, when a condition that s=0 is applied, the expression (eq16) above becomes an expression (eq19) below.

$$\frac{\Delta trq}{\Delta\delta} = G_{\delta t}(0) + G_{vt}(0)\frac{\Delta V_r}{\Delta\delta} = A_{\delta t} \qquad (\text{eq 19})$$

Figure 10A:
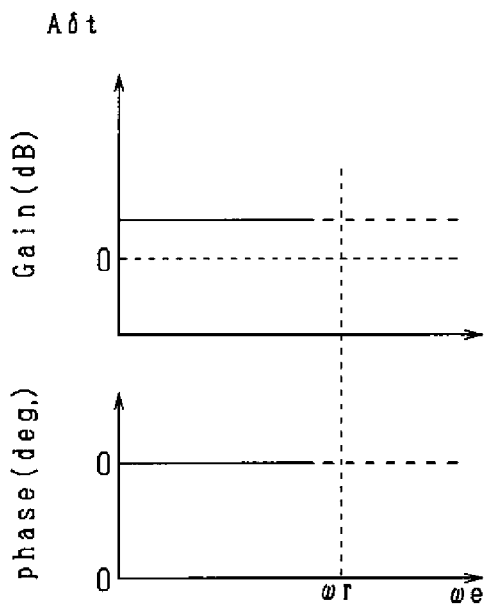
FIGS. 10A and 10B are diagrams of frequency characteristics of transfer functions of a motor generator in which non-interference is achieved.

According to the present embodiment, A$\delta$t in the expression (eq19) above is referred to as a phase-side transfer function. The first and second transfer functions G$\delta$t(0) and Gvt(0) can be calculated should the operation point of the motor generator 10 be determined. Therefore, should the operation point and the ratio of the amplitude minute change amount $\Delta Vr$ and the phase minute change amount $\Delta\delta$ be known, the phase-side transfer function A$\delta$t can be calculated from the expression (eq19) above. FIG. 10A shows the phase-side transfer function A$\delta$t at a predetermined operation point.

Meanwhile, when the condition that the drive state of the motor generator 10 is the steady state is applied, the expression (eq18) above becomes an expression (eq20) below.

$$\frac{\Delta i\lambda}{\Delta V_r} = G_{v\lambda}(0) = B_{v\lambda} \qquad (\text{eq 20})$$

Figure 10B:
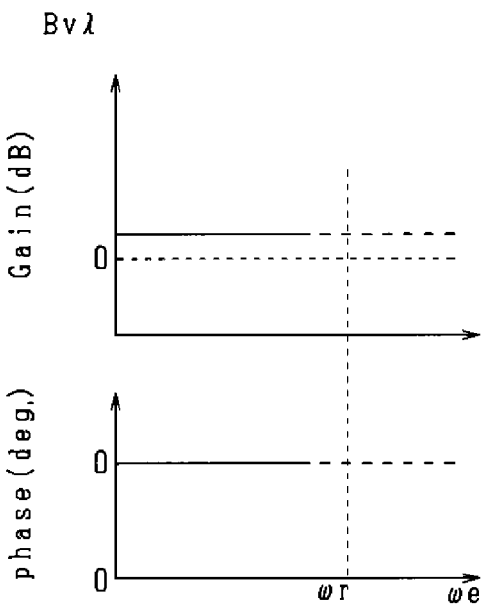

According to the present embodiment, Bv$\lambda$ in the expression (eq20) above is referred to as an amplitude-side transfer function. The fourth transfer functions Gv$\lambda$(0) can be calculated should the operation point of the motor generator 10 be determined. Therefore, should the operation point be known, the amplitude-side transfer function Bv$\lambda$ can be calculated from the expression (eq20) above. In this case, the ratio of the amplitude minute change amount $\Delta Vr$ and the phase minute change amount $\Delta\delta$ is unnecessary. FIG. 10B shows the amplitude-side transfer function Bv$\lambda$ at a predetermined operation point.

Figure 11:
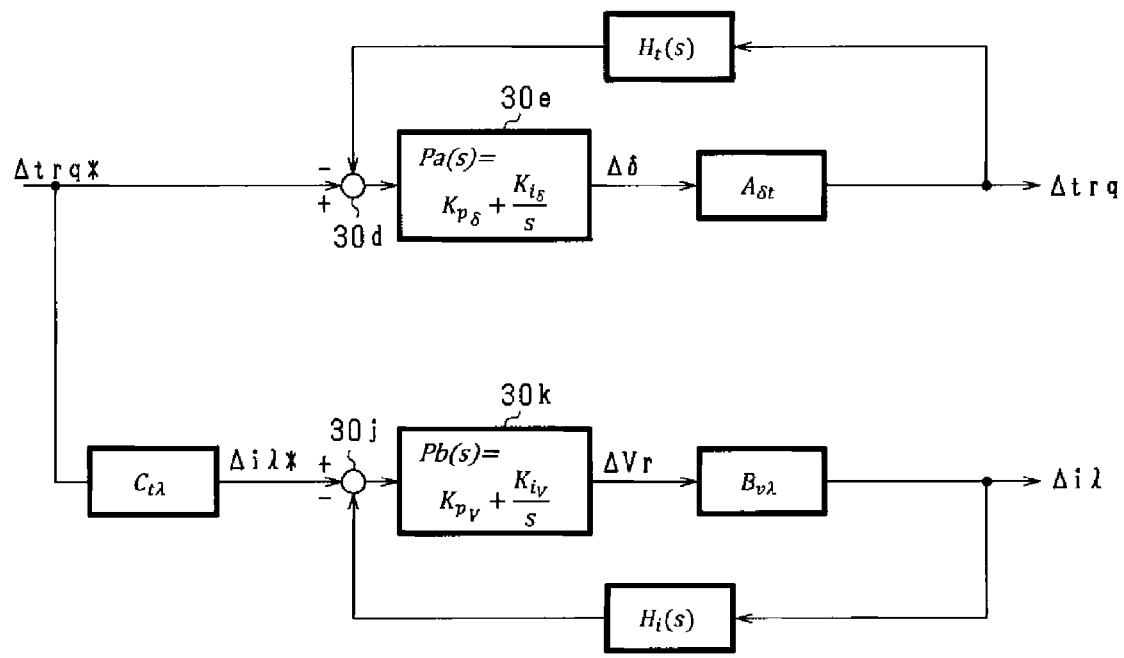
FIG. 11 is a block diagram of a torque feedback control system in which non-interference is achieved.

The block diagram shown in FIG. 8 can be expressed as the block diagram shown in FIG. 11, through use of the above-described phase-side transfer function A$\delta$t and amplitude-side transfer function Bv$\lambda$. In the block diagram shown in FIG. 11, interference from the voltage phase $\delta$ to the voltage amplitude Vr, and interference from the voltage amplitude Vr to the voltage phase $\delta$ are resolved. Therefore, the feedback control system including the phase calculating unit 30e and the feedback control system including the amplitude calculating unit 30k can be separately designed to prevent decrease in torque controllability attributed to mutual interference.

Next, the gain setting process will be described with reference to FIG. 12. The gain setting process is repeatedly performed by the gain setting unit 30q at, for example, every predetermined cycle.

In the series of processes, first, at step S10, the gain setting unit 30q acquires the command torque Trq*, the electrical angular frequency $\omega e$, the power supply voltage VINV, and the voltage amplitude Vr calculated by the amplitude calculating unit 30k. According to the present embodiment, the process at step S10 corresponds to an information acquiring unit.

At subsequent step S12, the gain setting unit 30q determines whether or not the voltage amplitude Vr is less than an upper limit value Vlim thereof. The gain setting unit 30q performs this process to determine which of the phase amplitude control and the phase control is being performed. Here, the upper limit value Vlim is set to a voltage amplitude corresponding to the above-described second modulation factor Mb.

Figure 13:
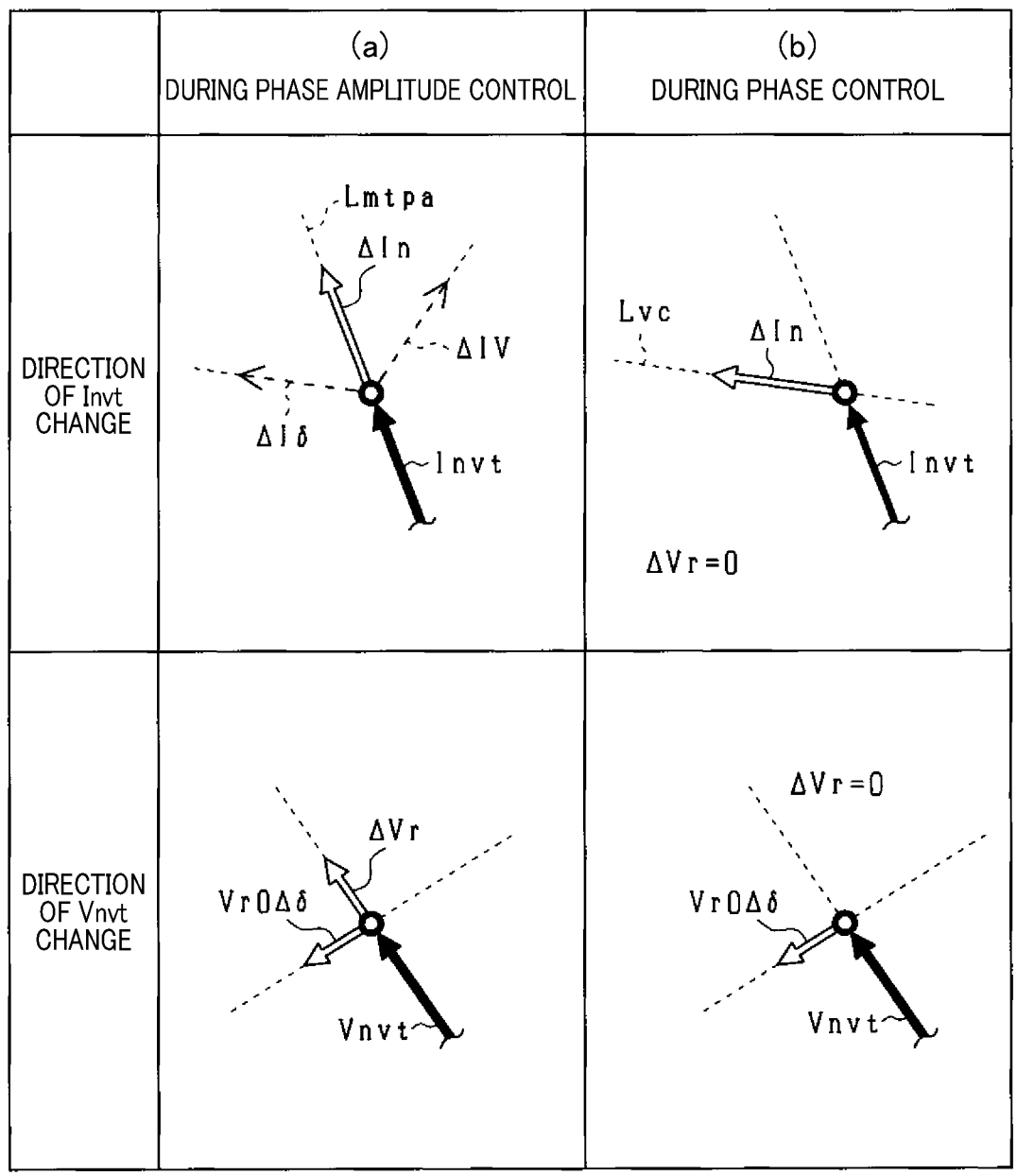
FIG. 13 is a diagram of the behaviors of the current and voltage vectors during phase amplitude control and phase control.

When determined YES at step S12, the gain setting unit 30q determines that the phase amplitude control is being performed and proceeds to step S14. At step S14, the gain setting unit 30q calculates the amplitude minute change amount $\Delta Vr$ and the phase minute change amount $\Delta\delta$ during the phase amplitude control. Here, FIG. 13 shows, by (a), the current vector Invt and the voltage vector Vnvt during the phase amplitude control. ΔIδ indicates the current change amount when the voltage phase δ changes by the phase minute change amount Δδ. ΔIV indicates the current change amount when the voltage amplitude Vr changes by the amplitude minute change amount ΔVr. ΔIn indicates the change in magnitude of the current vector Inv, and is oriented along an MTPA line Lmtpa during the phase amplitude control. Therefore, the amplitude minute change amount ΔVr and the phase minute change amount Δδ can be acquired from the minute change amounts in the voltage amplitude and the voltage phase of the voltage vector Vntv when the current vector minutely changes on the MTPA line Lmtpa. In addition, Vr0 indicates the magnitude of the voltage vector Vnvt. Vr0×Δδ indicates the change in the voltage vector Vnvt when the voltage phase δ changes by the phase minute change amount ΔS.

Figure 12:
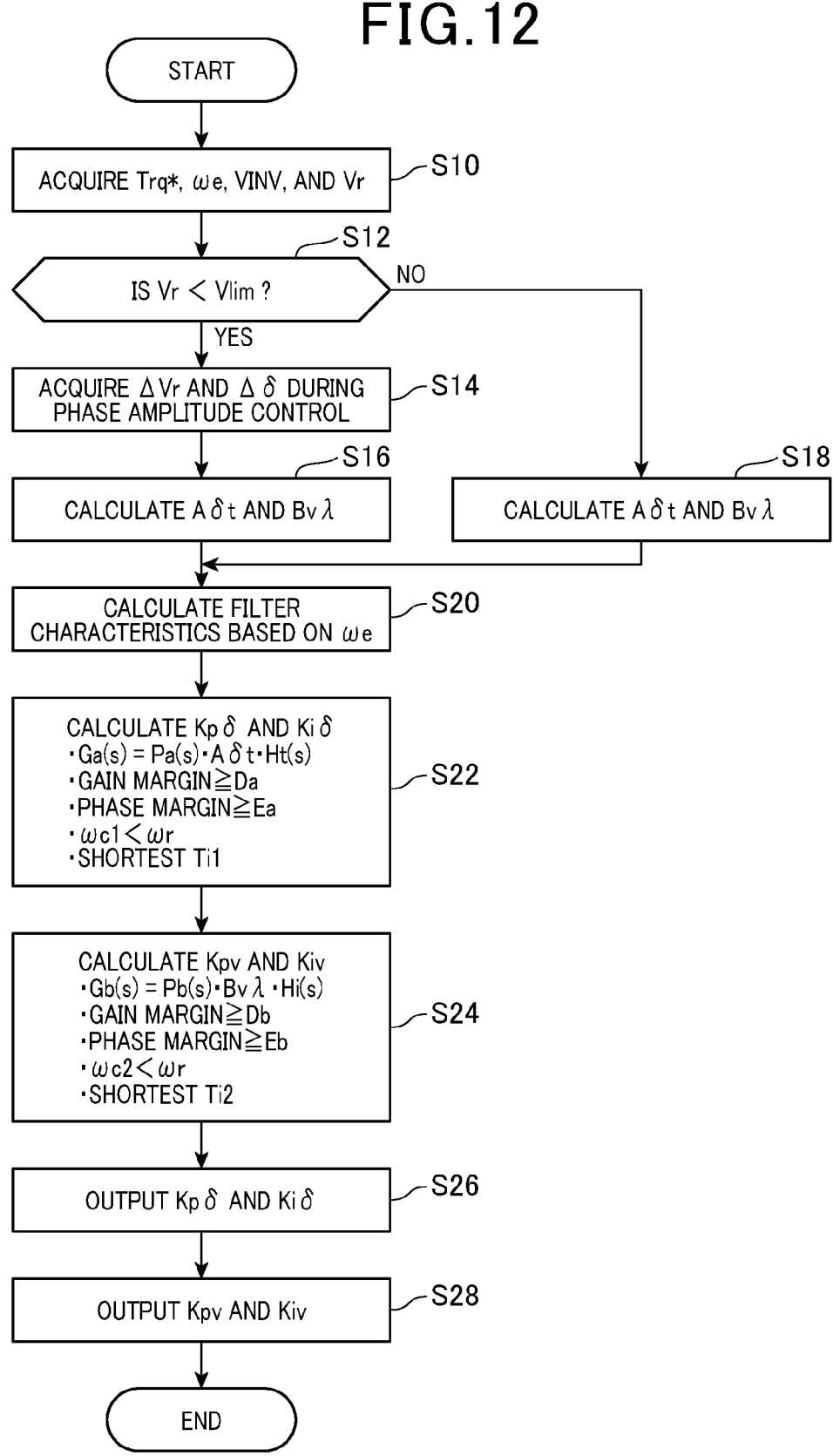
FIG. 12 is a flowchart of the steps in a gain setting process.

Returning to the description of FIG. 12 given above, at subsequent step S16, the gain setting unit 30q calculates the phase-side transfer function Aδt based on the above-described expression (eq19). Specifically, first, the gain setting unit 30q calculates the first and second transfer functions Gδt(0) and Gvt(0) given as real numbers based on the command torque Trq*, the electrical angular frequency we, and the power supply voltage VINV. Then, the gain setting unit 30q calculates the phase-side transfer function Aδt by inputting the calculated first and second transfer functions Gδt(0) and Gvt(0), and the ratio of the amplitude minute change amount ΔVr and the phase minute change amount Δδ to the expression (eq19). For example, the first and second transfer functions Gδt(0) and Gvt(0) may be calculated based on a mathematical expression or a map in which the first and second transfer functions Gδt(0) and Gvt(0) are prescribed in association with the command torque Trq*, the electrical angular frequency ωe, and the power supply voltage VINV.

In addition, at step S16, the gain setting unit 30q calculates the amplitude-side transfer function Bvλ based on the above-described expression (eq20). Specifically, the gain setting unit 30q calculates the fourth transfer function Gvλ(0) given as a real value based on the command torque Trq*, the electrical angular frequency ωe, and the power supply voltage VINV. The gain setting unit 30q then sets the calculated fourth transfer function Gvλ(0) as the amplitude-side transfer function Bvλ. For example, the fourth transfer function Gvλ(0) may be calculated based on a mathematical expression or a map in which the fourth transfer function Gvλ(0) is prescribed in association with the command torque Trq*, the electrical angular frequency ωe, and the power supply voltage VINV.

Meanwhile, when determined NO at step S12, the gain setting unit 30q determines that the phase control is being performed and proceeds to step S18. At step S18, the gain setting unit 30q calculates the first transfer function Gδt(0) based on the command torque Trq*, the electrical angular frequency ωe, and the power supply voltage VINV. The gain setting unit 30q then sets the calculated first transfer function Gδt(0) as the phase-side transfer function Aδt. A reason for this is that, because the amplitude minute change amount ΔVr becomes zero while the phase control is being performed, the above-described expression (eq19) can become an expression (eq21) below. FIG. 13 shows, by (b), the current vector Invt and the voltage vector Vnvt during the phase control.

$$A_{\delta t}=G_{\delta t}(0) \tag{eq21}$$

In addition, at step S18, the gain setting unit 30q calculates the amplitude-side transfer Bvλ function based on the above-described expression (eq20).

After completing the process at step S16 or S18, the gain setting unit 30q proceeds to step S20. The gain setting unit 30q sets the filter characteristics of the transfer functions Ht(s) and Hi(s) of the filter based on the electrical angular frequency ωe. Here, the gain setting unit 30q sets the filter characteristics such as to suppress resonance of the first to fourth transfer functions Gδt, Gvt, Gδλ, and Gvλ of the motor generator 10. Specifically, the filter characteristics may be set such that a cut-off frequency ωoff of the transfer functions Ht(s) and Hi(s) is lower than the resonance angular frequency ωr.

At subsequent step S22, the gain setting unit 30q calculates the first proportional gain Kpδ and the first integral gain Kiδ. According to the present embodiment, the gain setting unit 30q calculates the first proportional gain Kpδ and the first integral gain Kiδ such that following conditions (A) to (D) are met.

Condition (A) is that a gain margin in the gain frequency characteristics of a first loop transfer function Ga(s), shown in an expression (eq22) below, is a first predetermined value Da or greater. Here, the gain margin is a value at which, regarding a phase intersection angular frequency, the gain in the gain frequency characteristics of the loop transfer function Ga(s) is less than 0 dB. The phase intersection angular frequency is the angular frequency when the phase frequency characteristic of the first loop transfer function Ga(s) is 180 degrees.

$$G_a(s)=P_a(s) \cdot A_{\delta t} \cdot H_t(s) \tag{eq22}$$

Condition (B) is that a phase margin in the phase frequency characteristics of the first loop transfer function Ga(s) is a first predetermined phase Ea or greater. Here, the phase margin is a value at which, regarding a gain intersection angular frequency, the phase frequency characteristics of the loop transfer function Ga(s) is greater than −180 degrees. The gain intersection angular frequency is the angular frequency when the gain frequency characteristics of the first loop transfer function Ga(s) is 0 dB.

Condition (C) is that a gain intersection angular frequency ωc1 of the first loop transfer function Ga(s) is less than the respective resonance angular frequency ωr of the first transfer function Gδt(s) and the second transfer function Gvt(s).

Condition (D) is that the above-described conditions (A) to (C) are met and an integral time Ti1 of the integral control of the phase calculating unit 30e is the shortest.

At subsequent step S24, the gain setting unit 30q calculates the second proportional gain Kpv and the second integral gain Kiv. According to the present embodiment, the gain setting unit 30q calculates the second proportional gain Kpv and the second integral gain Kiv such that such that following conditions (E) to (H) are met.

Condition (E) is that the gain margin in the gain frequency characteristics of a second loop transfer function Gb(s), shown in an expression (eq23) below, is a second predetermined value Db or greater.

$$G_b(s)=P_b(s) \cdot B_{v\lambda} \cdot H_i(s) \tag{eq23}$$

Condition (F) is that the phase margin in the phase frequency characteristics of the second loop transfer function Gb(s) is a second phase Eb or greater.

Condition (G) is that a gain intersection angular frequency ωc2 of the second loop transfer function Gb(s) is less than the respective resonance angular frequency ωr of the third transfer function Gδλ(s) and the fourth transfer function Gvλ(s).

Condition (H) is that the above-described conditions (E) to (G) are met and an integral time Ti2 of the integral control of the amplitude calculating unit 30k is the shortest.

At subsequent step S26, the gain setting unit 30q outputs the first proportional gain Kpδ and the first integral gain Kiδ calculated in the process at Step S22 to the phase calculating unit 30e. As a result, the calculated first proportional gain Kpδ and first integral gain Kiδ are used in the calculation for the voltage phase δ.

At subsequent step S28, the gain setting unit 30q outputs the second proportional gain Kpv and the second integral gain Kiv calculated in the process at Step S24 to the amplitude calculating unit 30k. As a result, the calculated second proportional gain Kpv and second integral gain Kiv are used in the calculation for the voltage amplitude Vr.

The gain setting technique by the above-described the gain setting process is based on the transfer functions Gδt, Gvt, Gδλ, and Gvλ in the low frequency region lower than the resonance angular frequency or being able to be considered constants. Therefore, for example, the above-described gain setting process may be performed under a condition that the electrical angular frequency ωe is equal to or lower than a predetermined angular frequency that is lower than the resonance angular frequency ωr. In addition, for example, torque control of the motor generator 10 may be performed such that the electrical angular frequency ωe becomes the predetermined angular frequency or lower.

According to the present embodiment described in detail above, the following effects can be achieved.

The first and second transfer functions Gδt(s) and Gvt(s) included in the phase-side transfer function Aδt are set to the first and second transfer functions Gδt(0) and Gvt(0) of when s=0. In addition, the fourth transfer function Gvλ(s) included in the amplitude-side transfer function Bvλ is set to the fourth transfer function Gvλ(0) of when s=0. Therefore, the phase frequency characteristics of the first, second, and fourth transfer functions Gδt, Gvt, and Gvλ are zero degrees or a value near zero degrees. Consequently, the first, second, and fourth transfer functions Gδt(0), Gvt(0), and Gvλ(0) can be considered constants at each operation point of the motor generator 10. As a result, the effects of mutual interference between torque control based on the voltage phase δ and torque control based on the voltage amplitude Vr can be suppressed. Consequently, control systems can be independently designed in the phase calculating unit 30e and the amplitude calculating unit 30k. Proportional and integral gains that enable decrease in torque controllability to be prevented can be separately set.

The first, second, and fourth transfer functions Gδt, Gvt, and Gvλ are calculated based on the command torque Trq*, the electrical angular frequency ωe, and the power supply voltage VINV. Therefore, even when the operation point of the motor generator 10 changes, responsiveness and stability of torque controllability in the motor generator 10 can be kept at high levels.

During the phase control, the amplitude minute change amount ΔVr is zero because the phase amplitude is fixed. Therefore, the second transfer function Gvt in the phase-side transfer function Aδt can be ignored. As a result, the second transfer function Gvt is not required to be calculated when the first proportional gain Kpδ and the first integral gain Kiδ are calculated. Consequently, calculation load placed on the control apparatus 30 can be reduced.

The MTPA line Lmtpa extends from a point of origin O such as to move away from the coordinate axis of the q-axis current Iq. Therefore, the voltage phase δ and the voltage amplitude Vr are each required to be manipulated by a certain amount of manipulation to position the current vector Invt on the MTPA line Lmtpa. As a result, during the maximum torque per ampere control, the amplitude minute change amount ΔVr and the phase minute change amount Δδ each tend to increase by a certain extent. Consequently, even should noise be superimposed on the minute change amounts ΔVr and Δδ used to calculate the phase-side transmission function Aδt, the risk of the minute change amounts ΔVr and Δδ becoming buried in the noise is small. Therefore, in the configuration in which the maximum torque per ampere control is used, calculation accuracy of the phase-side transfer function Aδt can be improved.

The first proportional gain Kpδ and the first integral gain Kiδ are calculated under the above-described condition (D). In addition, the second proportional gain Kpv and the second integral gain Kiv are calculated under the above-described condition (H). Therefore, the gains near the resonance angular frequencies of the first and second loop transfer functions Ga and Gb can be reduced. Stability of torque control can be improved.

The fourth transfer function Gvλ(s) of which the input is the voltage phase and the output is the λ-axis current is used to design the control system. When the amplitude-side transfer function Bvλ is calculated, the fourth transfer function Gvλ(0) can be ignored and is not required to be calculated. Therefore, calculation load placed on the control apparatus 30 can be reduced.

Second Embodiment

A second embodiment will be described below, with reference to the drawings. The description mainly focuses on the differences from the above-described first embodiment. According to the present embodiment, the setting technique of the feedback gains is modified.

Figure 14:
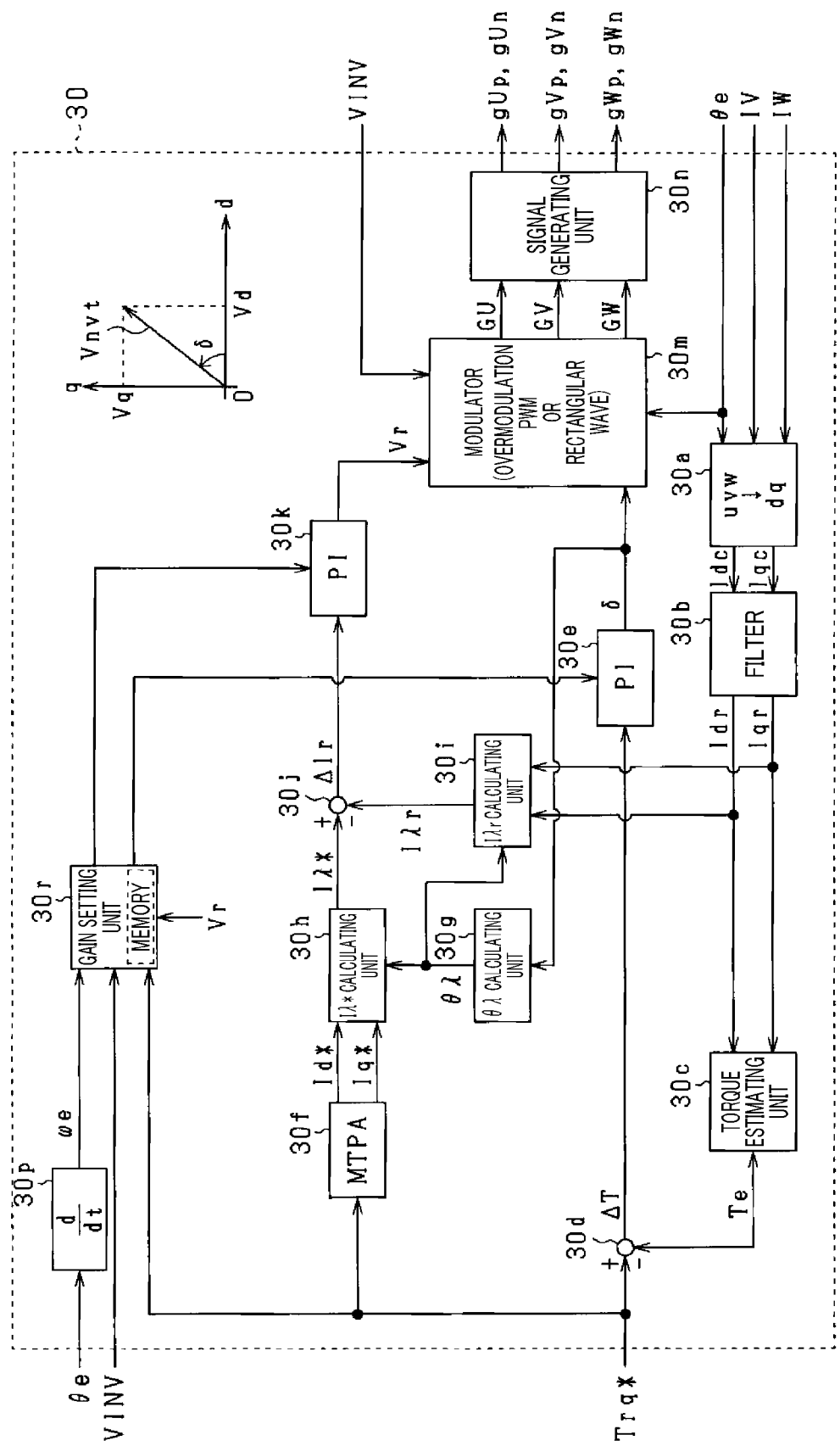
FIG. 14 is a functional block diagram of a motor control process according to a second embodiment.

FIG. 14 shows a functional block diagram of torque control according to the present embodiment. In FIG. 14, configurations that are the same as the above-described configurations shown in FIG. 2 are given the same reference numbers for convenience.

Figure 15A:
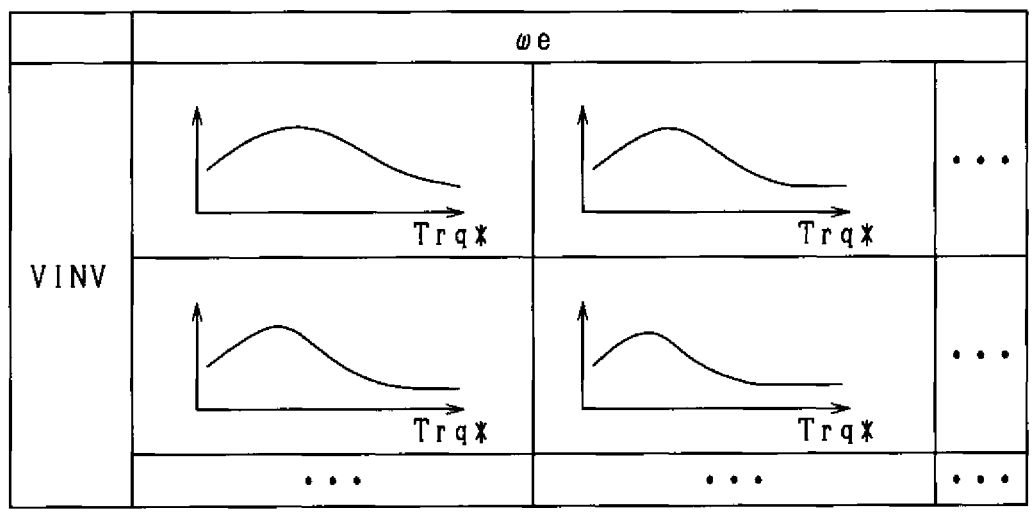
FIGS. 15A and 15B are diagrams of map information for gain stored in a storage unit.
Figure 15B:
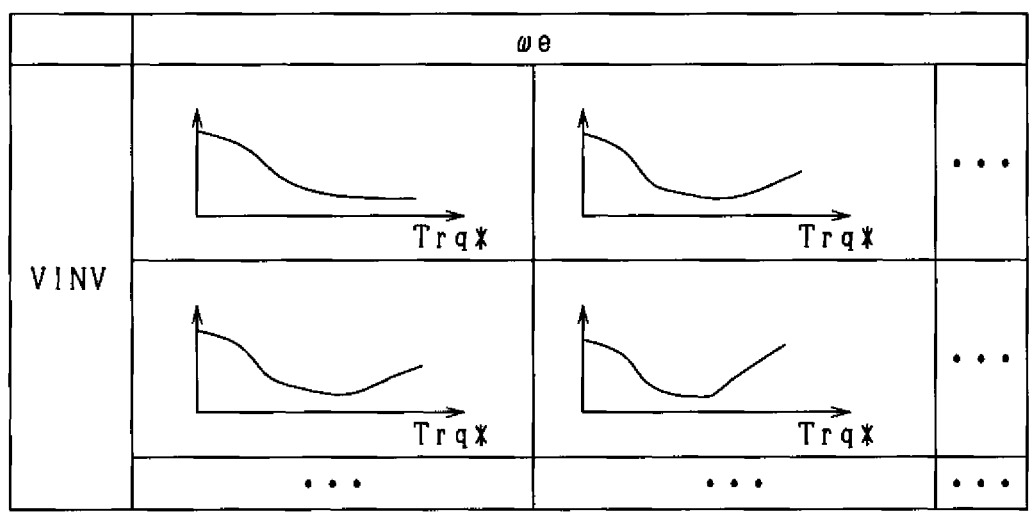

As shown in FIG. 14, a gain setting unit 30r includes a memory that serves as a storage unit. As shown in FIGS. 15A and 15B, the memory stores therein, in advance, map information prescribing the first proportional gain Kpδ and the first integral gain Kiδ in association with the command torque Trq*, the electrical angular frequency ωe, and the power supply voltage VINV. The first proportional gain Kpδ and the first integral gain Kiδ stored in the memory are adapted to meet the above-described conditions (A) to (D).

The memory also stores therein, in advance, map information prescribing the second proportional gain Kpv and the second integral gain Kiv in association with the command torque Trq*, the electrical angular frequency ωe, and the power supply voltage VINV. The second proportional gain Kpv and the second integral gain Kiv stored in the memory are adapted to meet the above-described conditions (E) to (H).

Figure 16:
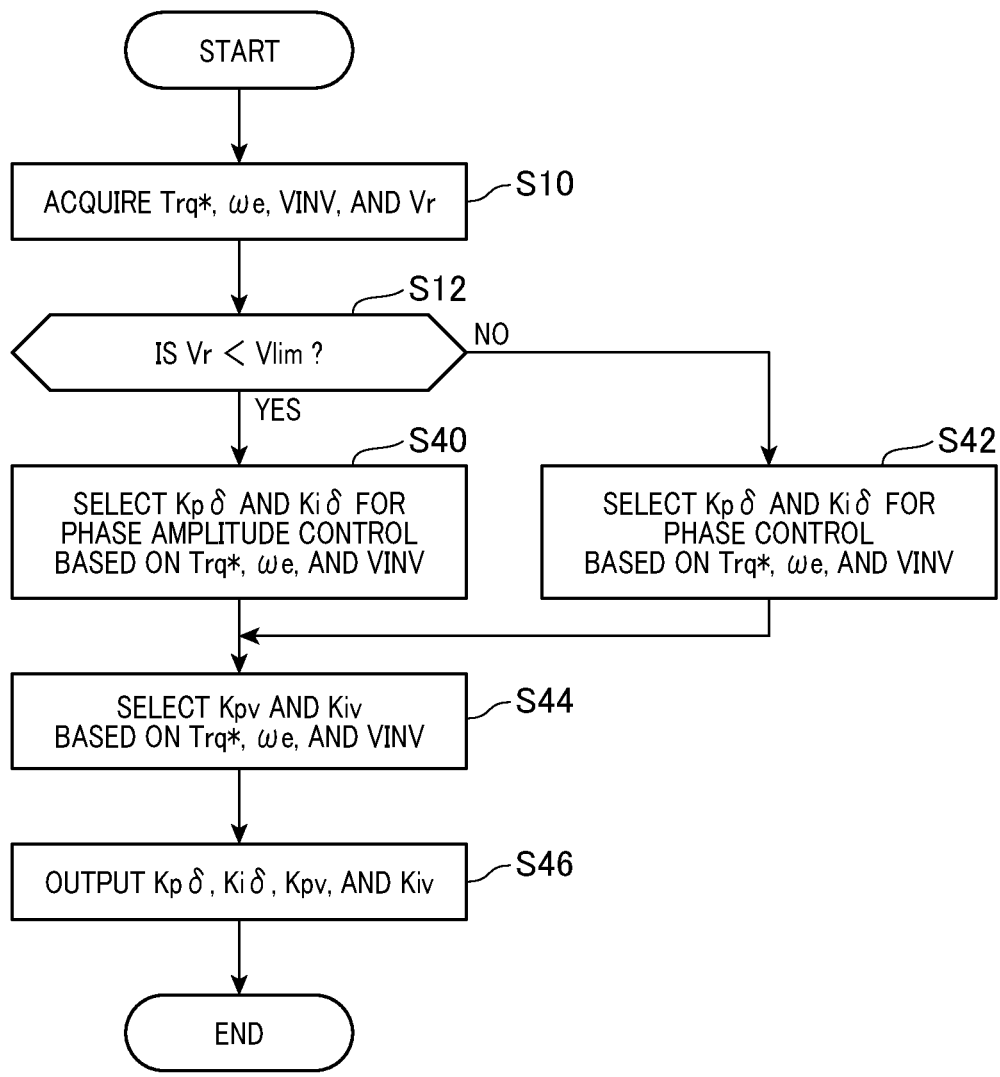
FIG. 16 is a flowchart of the steps in a gain setting process.

Next, a gain setting process according to the present embodiment will be described with reference to FIG. 16. The gain setting process is repeatedly performed by the gain setting unit 30r at, for example, every predetermined cycle. In FIG. 16, processes that are the same as the above-described processes shown in FIG. 12 are given the same reference numbers for convenience.

In the series of processes, when determined YES at step S12, the gain setting unit 30r determines that the phase amplitude control is being performed and proceeds to step S40. At step S40, the gain setting unit 30r selects the first proportional gain Kpδ and the first integral gain Kiδ from the information stored in the memory based on the acquired command torque Trq*, electrical angular frequency ωe, and power supply voltage VINV. The first proportional gain Kpδ and the first integral gain Kiδ selected at step S40 are adapted through use of the phase-side transfer function Aδt shown in the above-described expression (eq19).

Meanwhile, when determined NO at step S12, the gain setting unit 30r determines that the phase control is being performed and proceeds to step S42. At step S42, the gain setting unit 30r selects the first proportional gain Kpδ and the first integral gain Kiδ from the information stored in the memory based on the acquired command torque Trq*, electrical angular frequency ωe, and power supply voltage VINV. The first proportional gain Kpδ and the first integral gain Kiδ selected at step S42 are adapted through use of the phase-side transfer function Aδt shown in the above-described expression (eq21).

Upon completing the process at step S40 or S42, the gain setting unit 30r proceeds to step S44. At step S44, the gain setting unit 30r selects the corresponding second proportional gain Kpv and second integral gain Kiv from the information stored in the memory based on the acquired command torque Trq*, electrical angular frequency ωe, and power supply voltage VINV. The second proportional gain Kpv and the second integral gain Kiv selected at step S44 are adapted through use of the amplitude-side transfer function Bvλ shown in the above-described expression (eq20).

At subsequent step S46, the gain setting unit 30r outputs the first proportional gain Kpδ and the first integral gain Kiδ selected in the process at step S40 or S42 to the phase calculating unit 30e. In addition, at step S46, the gain setting unit 30r outputs the second proportional gain Kpv and the second integral gain Kiv selected in the process at step S44 to the amplitude calculating unit 30k.

A nonlinear system of equations is required to be solved to calculate each feedback gain each time in real time. Therefore, the calculation load placed on the control apparatus 30 increases. In this regard, according to the present embodiment, the configuration is such that the feedback gains are selected from the map information based on the operation point. Therefore, the calculation load placed on the control apparatus 30 can be reduced.

According to the present embodiment, the memory may store therein only the feedback gains for phase control in the form of map information. A reason for this will be described below.

For a desired feedback gain to be designed, an operation point of the motor generator 10 is required to be determined. The operation point is prescribed based on the torque, the power supply voltage, and the electrical angular frequency of the motor generator 10. Then, the four transfer functions at the determined operation point are required to be specified. The operation point can be considered as being the current vector determined by the d- and q-axis currents. Therefore, the feedback gain is a function of the d- and q-axis currents Id and Iq.

Here, when maximum efficiency of the motor generator 10 is considered, the operation point is defined in the following manner. Specifically, during the phase control in which the voltage becomes saturated, as shown in above-described FIG. 7, an intersection between the constant voltage ellipse Lvc and the constant torque curve Lct is the operation point. Meanwhile, during the phase amplitude control in which the voltage is not saturated, an intersection between the MTPA line Lmtpa and the constant torque curve Lct is the operation point. The MTPA line Lmtpa and the constant torque curve Lct are uniquely determined by the torque of the motor generator 10.

Meanwhile, though the constant voltage ellipse Lvc is prescribed by the electrical angular frequency and the power supply voltage, a nonlinear system of equations is required to be solved to determine the intersection between the constant voltage ellipse Lvc and the constant torque curve Lct. Therefore, a problem occurs in that the calculation load placed on the control apparatus 30 becomes large. As a countermeasure to this problem, map information of only the feedback gains for phase control may be generated.

Third Embodiment

Figure 17A:
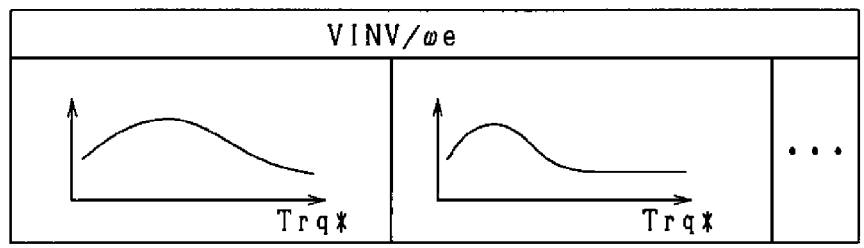
FIGS. 17A and 17B are diagrams of map information for gain stored in a storage unit according to a third embodiment.
Figure 17B:
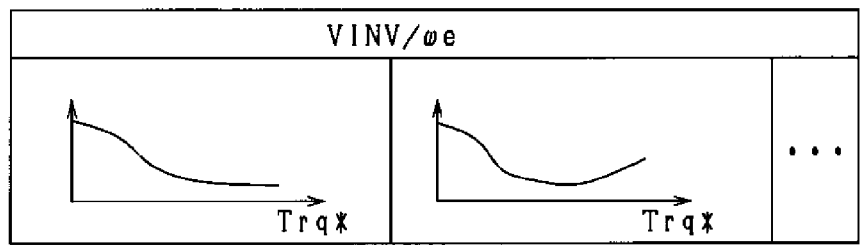

A third embodiment will be described below with reference to the drawings. The description mainly focuses on differences from the above-described second embodiment. According to the present embodiment, a storage mode for storing the feedback gains in the memory is modified. Specifically, as shown in FIGS. 17A and 17B, the memory stores therein, in advance, map information prescribing the first proportional gain Kpδ and the first integral gain Kiδ in association with ratio information expressed by VINV/ωe and the command torque Trq*. The ratio information expressed by VINV/ωe is a value obtained by the power supply voltage VINV being divided by the electrical angular frequency ωe. The memory also stores therein, in advance, map information prescribing the second proportional gain Kpv and the second integral gain Kiv in association with the ratio information and the command torque Trq*. In particular, according to the present embodiment, map information of only the feedback gains for phase control is generated.

The above-described storage mode is used to reduce the amount of information stored in the memory. A reason for associating the feedback gains and the ratio information will be described below.

The constant voltage ellipse Lvc will be considered. The constant voltage ellipse Lvc changes based on the electrical angular frequency and the power supply voltage. The voltage equation of the permanent magnet synchronous motor in a steady state and when armature winding resistance R is ignored is expressed by the above-described expression (eq3). When the sum of squares of the d- and q-axis voltages Vd and Vq of the expression (eq3) is calculated, an expression (eq24) below is derived.

$$Vr^2 = Vd^2 + Vq^2 \quad (eq24)$$

The expression (eq24) above is rewritten and summarized as an expression (eq25) below, using Vr/ωe that includes the voltage amplitude Vr corresponding to the power supply voltage VINV.

$$\frac{Vr^2}{\omega e^2} = (Ld \cdot Iq)^2 + (Ld \cdot Id + \Psi)^2 \quad (eq\ 25)$$

The expression (25) above is an equation that expresses an ellipse. The expression (25) indicates that, when Vr/ωe is fixed, the ellipses have the same shape. Therefore, during the phase control in which the voltage is saturated, the operation point of the motor generator 10 can be identified by Vr/ωe and the torque, that is, VINV/ωe and the torque.

Next, a gain setting process according to the present embodiment will be described, mainly focusing on the differences from the above-described process shown in FIG. 16.

The gain setting unit 30r calculates the ratio information expressed by VINV/ωe based on the acquired electrical angular frequency ωe and the power supply voltage VINV. The gain setting unit 30r then selects the first proportional gain Kpδ, the first integral gain Kiδ, the second proportional gain Kpv, and the second integral gain Kiv from the information stored in the memory based on the calculated ratio information and the command torque Trq*.

According to the present embodiment described above, the amount of information stored in the memory can be reduced.

Fourth Embodiment

Figure 18:
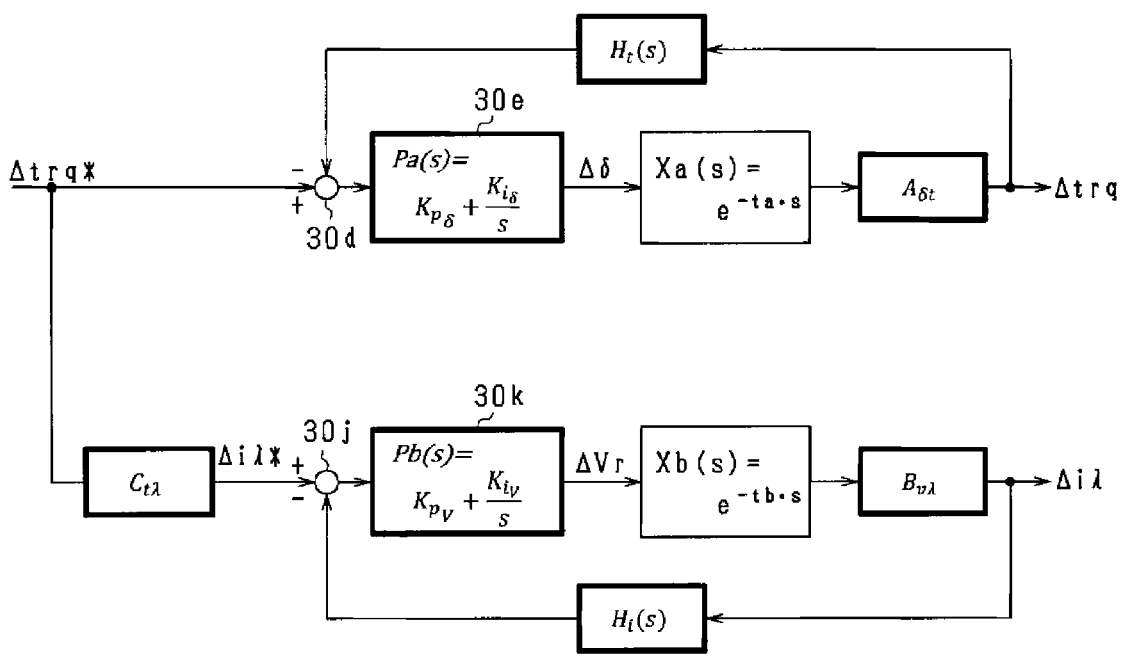
FIG. 18 is a block diagram of a torque feedback control system in which non-interference is achieved, according to a fourth embodiment.

A fourth embodiment will be described below with reference to the drawings. The description mainly focuses on differences from the above-described first embodiment. According to the present embodiment, as shown in FIG. 18, the first loop transfer function Ga(s) used to calculate the feedback gain includes a first dead time element Xa(s). In addition, the second loop transfer function Gb(s) includes a second dead time element Xb(s). In FIG. 18, configurations that are the same as the above-described configurations shown in FIG. 11 are given the same reference numbers for convenience.

The dead time elements Xa(s) and Xb(s) are provided to improve phase margin determination accuracy by various delay times in the torque feedback control system being reflected as dead time and being added to the conditions for phase margin determination. As a result, calculation accuracy for the feedback gains Kpδ, Kiδ, Kpv, and Kiv is improved.

The various delay times include, for example, input delay time from current detection by the phase current detecting unit to input of the current detection value to the filtering unit 30b, signal delay time from the control apparatus 30 to the inverter 20, delay time caused by analog-to-digital conversion of various detection values, and delay time attributed to output update at every control cycle.

Next, a method for taking account of the dead time elements Xa(s) and Xb(s) will be described.

At step S22 in FIG. 12, the gain setting unit 30q sets the first loop transfer function Ga(s) in the manner of an expression (eq26) below.

$$G_a(s) = P_a(s) \cdot X_a(s) \cdot A_{\delta t} \cdot H_i(s) \qquad \text{(eq26)}$$

Here, the delay time is converted to phase delay at the current electrical angular frequency ωe based on a value obtained by dead time ta of the first dead time element Xa being multiplied by the electrical angular frequency ωe. In addition, at step S24 in FIG. 12, the gain setting unit 30q sets the second loop transfer function Gb(s) in the manner of an expression (eq27) below.

$$G_b(s) = P_b(s) \cdot X_b(s) \cdot B_{v\lambda} \cdot H_i(s) \qquad \text{(eq27)}$$

Here, the delay time is converted to phase delay at the current electrical angular frequency ωe based on a value obtained by dead time tb of the second dead time element Xb being multiplied by the electrical angular frequency ωe.

According to the present embodiment described above, the determination accuracy for phase margin can be improved. Furthermore, the calculation accuracy for feedback gains can be improved.

Other Embodiments

The above-described embodiments may be modified in the following manner.

In the above-described third embodiment, map information of the feedback gains during phase amplitude control may be generated in addition to the feedback gains for phase control.

The feedback gains of the above-described second and third embodiments may be adapted through further use of the dead time elements described according to the fourth embodiment.

The condition (D) in the process at step S22 in FIG. 12 is not essential. In addition, the condition (H) in the process at step S24 is not essential.

In the above-described first embodiment, the proportional and integral gains are set based on the transfer functions Gδt, Gvt, and Gvλ when s=0. However, the present disclosure is not limited thereto. For example, the proportional and integral gains may be set based on the transfer functions Gδt, Gvt, and Gvλ when 0<ωe<ωr. In this case as well, the effects of mutual interference can be suppressed because the phases of the transfer functions Gδt, Gvt, and Gvλ do not significantly deviate from zero.

In the above-described first embodiment, the voltage amplitude Vr is calculated as the manipulated variable performing feedback control to control the λ-axis current Iλr to the λ-axis command current Iλ*. However, the present disclosure is not limited thereto. For example, the voltage amplitude may be calculated as a manipulated variable for performing feedback control to control the d-axis current Idr to a d-axis command current Id*. In this case, the third transfer function becomes a transfer function Gδd of which the input is the phase minute change amount Δδ and the output is a first d-axis current change amount Δid1. The first d-axis current change amount Δid1 is the change amount of the d-axis current when the voltage phase δ changes by the phase minute change amount Δδ. In addition, the fourth transfer function becomes a transfer function Gvd(s) of which the input is the amplitude minute change amount ΔVr and the output is a second d-axis current change amount Δid2. The second d-axis current change amount Δid2 is the change amount of the d-axis current when the voltage amplitude Vr changes by amplitude minute change amount ΔVr. The value obtained by the first d-axis current change amount Δid1 and the second d-axis current change amount Δid2 being added is a total d-axis current change amount Δidt. In this configuration, an expression (eq28) below is defined instead of the above-described expression (eq15).

$$\Delta idt = \Delta id1 + \Delta id2 \qquad \text{(eq 28)}$$
$$= G_{\delta d}(s)\Delta \delta + G_{vd}(s)\Delta V_r$$

The expression (eq28) above is expressed as an expression (eq29) below.

$$\frac{\Delta idt}{\Delta V_r} = G_{\delta d}(s)\frac{\Delta \delta}{\Delta Vr} + G_{vd}(s) \qquad \text{(eq 29)}$$

In this case, even during the phase control in which the voltage is saturated, the amplitude-side transfer function is required to be calculated by the phase minute change amount Δδ and the amplitude minute change amount ΔVr being inputted to the expression (eq29) above.

The method for calculating the d- and q-axis command currents Id* and Iq* is not limited to that based on the maximum torque per ampere control. For example, the method may be that in which the d-axis command current Id* is zero.

The torque used for torque feedback control is not limited to the torque estimated value. For example, the torque may be a detected value of a torque detector that detects the torque of the motor generator 10.

Derivative control may be included in the feedback control of the phase calculating unit 30e and the amplitude calculating unit 30k.

In the above-described first embodiment, the command torque Trq*, the electrical angular frequency ωe, and the power supply voltage VINV are used as parameters expressing the operation point of the motor generator 10 associated with the transfer functions of the motor generator 10. However, the present disclosure is not limited thereto. For example, a part of and at least one of the command torque Trq*, the electrical angular frequency ωe, and the power supply voltage VINV may be used. This similarly applies to the operation points associated with the feedback gains according to the above-described second and third embodiments.

In addition, the voltage amplitude Vr or the modulation factor Mr may be used instead of the power supply voltage VINV as a parameter expressing the operation point. Alternatively, a mechanical angular frequency of the motor generator may be used instead of the electrical angular frequency ωe.

In above-described FIG. 2, the filtering unit 30b may be provided between the two-phase converting unit 30a and the torque estimating unit 30c, or between the torque estimating unit 30c and the torque deviation calculating unit 30d.

The motor generator is not limited to the IPMSM and may be a surface permanent magnet synchronous motor (SPMSM). In this case, the q-axis command current Iq* may be used instead of the command torque Trq* as a parameter expressing the operation point.

In addition, the motor generator is not limited to the permanent magnet field type and may be a winding field type. Furthermore, the motor generator is not limited to a synchronous motor and may be, for example, an induction motor.

The motor generator is not limited to a three-phase motor, and may have a number of phases other than three.

The motor generator is not limited to that used as an on-board main machine and may be that used for other purposes, such as an electric motor configuring an electric power steering apparatus.

What is claimed is:

1. A control apparatus for a rotating electric machine that is electrically connected to an inverter, the control apparatus comprising:
   a phase calculating unit that calculates a voltage phase that is a phase of a voltage vector of a voltage applied to the rotating electric machine, as a manipulated variable for performing feedback control to control a torque of the rotating electric machine to a command torque;
   an amplitude calculating unit that calculates a voltage amplitude that is a magnitude of the voltage vector, as a manipulated variable for performing feedback control to control a current flowing to the rotating electric machine to a command current corresponding to the command torque;
   a control unit that controls the torque to the command torque by operating the inverter based on the voltage phase and the voltage amplitude;
   a phase gain setting unit that sets a phase feedback gain used for feedback control of the phase calculating unit such that a first condition and a second condition are met, the first condition being that a gain margin and a phase margin in frequency characteristics of a first loop transfer function are ensured, the second condition being that a gain intersection angular frequency in frequency characteristics of the first loop transfer function is lower than respective resonance angular frequency in frequency characteristics of a first transfer function and a second transfer function,
   the first loop transfer function being a loop transfer function of which an input is the voltage phase and an output is the torque or a value obtained by a high frequency component being removed from the torque, the loop transfer function including a transfer function for feedback control of the phase calculating unit and a phase-side transfer function,
   the phase-side transfer function being a transfer function that expresses frequency characteristics of the rotating electric machine of which an input is the voltage phase and an output is the torque, the transfer function including the first transfer function and the second transfer function,
   the first transfer function being a transfer function that expresses frequency characteristics of the rotating electric machine of which an input is the voltage phase and an output is the torque,
   the second transfer function being a transfer function that expresses frequency characteristics of the rotating electric machine of which an input is the voltage amplitude and an output is the torque; and
   an amplitude gain setting unit that sets an amplitude feedback gain used for feedback control of the amplitude calculating unit such that a third condition and a fourth condition are met, the third condition being that a gain margin and a phase margin in frequency characteristics of a second loop transfer function are ensured, the fourth condition being that a gain intersection angular frequency in frequency characteristics of a second loop transfer function is lower than respective resonance angular frequency in frequency characteristics of a third transfer function and a fourth transfer function,
   the second loop transfer function being a loop transfer function of which an input is the voltage amplitude and an output is the command current or a value obtained by a high frequency component being removed from the command current, the loop transfer function including a transfer function for feedback control of the amplitude calculating unit and an amplitude-side transfer function,
   the amplitude-side transfer function being a transfer function that expresses frequency characteristics of the rotating electric machine of which an input is the phase amplitude and an output is the command current, the transfer function including the third transfer function and the fourth transfer function,
   the third transfer function being a transfer function that expresses frequency characteristics of the rotating electric machine of which an input is the voltage phase and an output is the command current, the fourth transfer function being a transfer function that expresses frequency characteristics of the rotating electric machine of which an input is the voltage amplitude and an output is the command current.

2. The control apparatus for a rotating electric machine according to claim 1, wherein:

the phase-side transfer function includes the first transfer function and the second transfer function in a steady state; and the amplitude-side transfer function includes the third transfer function and the fourth transfer function in the steady state.

3. The control apparatus for a rotating electric machine according to claim 1, wherein:

the second transfer function in the phase-side transfer function is multiplied by a value obtained by a change amount of the voltage amplitude being divided by a change amount of the voltage phase;

the control apparatus further comprises a determining unit (30) that determines whether or not the voltage amplitude is fixed during operation of the inverter based on the voltage phase; and the phase gain setting unit uses the first loop transfer function that includes the phase-side transfer function from which the second transfer function is removed to set the phase feedback gain, when the determining unit determines that the voltage amplitude is fixed.

4. The control apparatus for a rotating electric machine according to claim 1, wherein:

the second transfer function in the phase-side transfer function is multiplied by a value obtained by a change amount of the voltage amplitude being divided by a change amount of the voltage phase; and the phase gain setting unit calculates the phase-side transfer function used to set the phase feedback gain based on the respective change amounts of the voltage amplitude and the voltage phase when the inverter is operated based on the voltage phase and the voltage amplitude.

5. The control apparatus for a rotating electric machine according to claim 4, wherein:

the command current is a value calculated based maximum torque per ampere control; and the change amount of the voltage amplitude and the change amount of the voltage phase are defined as change amounts when the command current for actualizing maximum torque per ampere control is minutely changed.

6. The control apparatus for a rotating electric machine according to claim 1, further comprising:

an information acquiring unit that acquires operation point information of the rotating electric machine that includes at least one of electrical angular frequency information of the rotating electric machine, torque information of the rotating electric machine, and power supply voltage information of the inverter;

a phase storage unit that stores therein the phase feedback gain that is associated with the operation point information and meets the first condition and the second condition; and an amplitude storage unit that stores therein the amplitude feedback gain that is associated with the operation information and meets the third condition and the fourth condition, wherein:

the phase gain setting unit sets the phase feedback gain based on the operation point information acquired by the information acquiring unit and the stored information of the storage unit; and the amplitude gain setting unit sets the amplitude feedback gain based on the operation point information acquired by the information acquiring unit and the stored information of the storage unit.

7. The control apparatus for a rotating electric machine according to claim 1, further comprising:

an information acquiring unit that acquires operation point information of the rotating electric machine that includes at least electrical angular frequency information of the rotating electric machine, and power supply voltage information of the inverter;

a phase storage unit that stores therein the phase feedback gain that is associated with ratio information that is information on a ratio of the electrical angular frequency to the power supply voltage and meets the first condition and the second condition; and an amplitude storage unit that stores therein the amplitude feedback gain that is associated with the ratio information and meets the third condition and the fourth condition, wherein:

the phase gain setting unit sets the phase feedback gain based on the operation point information acquired by the information acquiring unit and the stored information of the storage unit; and the amplitude gain setting unit sets the amplitude feedback gain based on the operation point information acquired by the information acquiring unit and the stored information of the storage unit.

8. The control apparatus for a rotating electric machine according to claim 1, wherein:

the first loop transfer function and the second loop transfer function each include a dead time element of a control system that performs feedback control to control the torque to the command torque.

9. The control apparatus for a rotating electric machine according to claim 1, wherein:

the feedback control of the phase calculating unit and the amplitude calculating unit is proportional-integral control;

the phase gain setting unit sets a first proportional gain and a first integral gain as the phase feedback gain such that the first condition and the second condition are met and an integral time of the integral control is the shortest; and the amplitude gain setting unit sets a second proportional gain and a second integral gain as the amplitude feedback gain such that the third condition and the fourth condition are met and an integral time of the integral control is the shortest.

10. The control apparatus for a rotating electric machine according to claim 1, wherein:

the first transfer function, the second transfer function, the third transfer function, and the fourth transfer function are each transfer functions prescribed by an operation point of the rotating electric machine;

the control apparatus further comprises an information acquiring unit that acquires operation point information of the rotating electric machine;

the phase gain setting unit sets the phase feedback gain based on the operation point information acquired by the information acquiring unit; and the amplitude gain setting unit sets the amplitude feedback gain based on the operation point information acquired by the information acquiring unit.

11. The control apparatus for a rotating electric machine according to claim 1, wherein;
the command current is a current that is a component of the current vector in a non-interfering axis direction, the non-interfering axis being a coordinate axis in a direction in which change in a current vector of a current flowing to the rotating electric machine is zero when the voltage phase minutely changes, in a rotary coordinate system of the rotating electric machine.

12. The control apparatus for a rotating electric machine according to claim 2, wherein:
the second transfer function in the phase-side transfer function is multiplied by a value obtained by a change amount of the voltage amplitude being divided by a change amount of the voltage phase;
the control apparatus further comprises a determining unit that determines whether or not the voltage amplitude is fixed during operation of the inverter based on the voltage phase; and
the phase gain setting unit uses the first loop transfer function that includes the phase-side transfer function from which the second transfer function is removed to set the phase feedback gain, when the determining unit determines that the voltage amplitude is fixed.

13. The control apparatus for a rotating electric machine according to claim 2, wherein:
the second transfer function in the phase-side transfer function is multiplied by a value obtained by a change amount of the voltage amplitude being divided by a change amount of the voltage phase; and
the phase gain setting unit calculates the phase-side transfer function used to set the phase feedback gain based on the respective change amounts of the voltage amplitude and the voltage phase when the inverter is operated based on the voltage phase and the voltage amplitude.

14. The control apparatus for a rotating electric machine according to claim 3, wherein:
the second transfer function in the phase-side transfer function is multiplied by a value obtained by a change amount of the voltage amplitude being divided by a change amount of the voltage phase; and
the phase gain setting unit calculates the phase-side transfer function used to set the phase feedback gain based on the respective change amounts of the voltage amplitude and the voltage phase when the inverter is operated based on the voltage phase and the voltage amplitude.

15. The control apparatus for a rotating electric machine according to claim 2, further comprising:
an information acquiring unit that acquires operation point information of the rotating electric machine that includes at least one of electrical angular frequency information of the rotating electric machine, torque information of the rotating electric machine, and power supply voltage information of the inverter;
a phase storage unit that stores therein the phase feedback gain that is associated with the operation point information and meets the first condition and the second condition; and
an amplitude storage unit that stores therein the amplitude feedback gain that is associated with the operation information and meets the third condition and the fourth condition, wherein:

the phase gain setting unit sets the phase feedback gain based on the operation point information acquired by the information acquiring unit and the stored information of the storage unit; and
the amplitude gain setting unit sets the amplitude feedback gain based on the operation point information acquired by the information acquiring unit and the stored information of the storage unit.

16. The control apparatus for a rotating electric machine according to claim 2, further comprising:
an information acquiring unit that acquires operation point information of the rotating electric machine that includes at least electrical angular frequency information of the rotating electric machine, and power supply voltage information of the inverter;
a phase storage unit that stores therein the phase feedback gain that is associated with ratio information that is information on a ratio of the electrical angular frequency to the power supply voltage and meets the first condition and the second condition; and
an amplitude storage unit that stores therein the amplitude feedback gain that is associated with the ratio information and meets the third condition and the fourth condition, wherein:
the phase gain setting unit sets the phase feedback gain based on the operation point information acquired by the information acquiring unit and the stored information of the storage unit; and
the amplitude gain setting unit sets the amplitude feedback gain based on the operation point information acquired by the information acquiring unit and the stored information of the storage unit.

17. A control method for a rotating electric machine that is electrically connected to an inverter, the control method comprising:
calculating, by a control apparatus provided in the rotating machine, a voltage phase that is a phase of a voltage vector of a voltage applied to the rotating electric machine, as a manipulated variable for performing feedback control to control a torque of the rotating electric machine to a command torque;
calculating, by the control apparatus, a voltage amplitude that is a magnitude of the voltage vector, as a manipulated variable for performing feedback control to control a current flowing to the rotating electric machine to a command current corresponding to the command torque;
controlling, by the control apparatus, the torque to the command torque by operating the inverter based on the voltage phase and the voltage amplitude;
setting, by the control apparatus, a phase feedback gain such that a first condition and a second condition are met, the first condition being that a gain margin and a phase margin in frequency characteristics of a first loop transfer function are ensured, the second condition being that a gain intersection angular frequency in frequency characteristics of the first loop transfer function is lower than respective resonance angular frequency in frequency characteristics of a first transfer function and a second transfer function,
the first loop transfer function being a loop transfer function of which an input is the voltage phase and an output is the torque or a value obtained by a high frequency component being removed from the torque, the loop transfer function including a transfer function for feedback control of the phase calculating unit and a phase-side transfer function, the phase-side transfer function being a transfer function that expresses frequency characteristics of the rotating electric machine of which an input is the voltage phase and an output is the torque, the transfer function including the first transfer function and the second transfer function, the first transfer function being a transfer function that expresses frequency characteristics of the rotating electric machine of which an input is the voltage phase and an output is the torque, the second transfer function being a transfer function that expresses frequency characteristics of the rotating electric machine of which an input is the voltage amplitude and an output is the torque; and setting, by the control apparatus, an amplitude feedback gain such that a third condition and a fourth condition are met, the third condition being that a gain margin and a phase margin in frequency characteristics of a second loop transfer function are ensured, the fourth condition being that a gain intersection angular frequency in frequency characteristics of a second loop transfer function is lower than respective resonance angular frequency in frequency characteristics of a third transfer function and a fourth transfer function, the second loop transfer function being a loop transfer function of which an input is the voltage amplitude and an output is the command current or a value obtained by a high frequency component being removed from the command current, the loop transfer function including a transfer function for feedback control of the amplitude calculating unit and an amplitude-side transfer function, the amplitude-side transfer function being a transfer function that expresses frequency characteristics of the rotating electric machine of which an input is the phase amplitude and an output is the command current, the transfer function including the third transfer function and the fourth transfer function, the third transfer function being a transfer function that expresses frequency characteristics of the rotating electric machine of which an input is the voltage phase and an output is the command current, the fourth transfer function being a transfer function that expresses frequency characteristics of the rotating electric machine of which an input is the voltage amplitude and an output is the command current.

* * * * *